US009276462B2

(12) United States Patent
Murakami et al.

(10) Patent No.: US 9,276,462 B2
(45) Date of Patent: Mar. 1, 2016

(54) VOLTAGE REGULATOR CONTROLLER AND SYSTEM INCLUDING VOLTAGE REGULATOR CONTROLLER

(71) Applicant: Renesas Electronics Corporation, Kawasaki-shi, Kanagawa (JP)

(72) Inventors: Hiroshi Murakami, Itami (JP); Tetsuo Ichino, Itami (JP); Shigeru Kurita, Itami (JP); Toshio Nagasawa, Itami (JP); Takuya Makise, Itami (JP)

(73) Assignee: Renesas Electronics Corporation, Tokyo (JP)

( * ) Notice: Subject to any disclaimer, the term of this patent is extended or adjusted under 35 U.S.C. 154(b) by 227 days.

(21) Appl. No.: 14/027,184

(22) Filed: Sep. 14, 2013

(65) Prior Publication Data

US 2014/0077781 A1    Mar. 20, 2014

(30) Foreign Application Priority Data

Sep. 14, 2012 (JP) .................................. 2012-202837
Sep. 28, 2012 (JP) .................................. 2012-216715
May 21, 2013 (JP) .................................. 2013-106947

(51) Int. Cl.
| | |
|---|---|
| G05F 1/00 | (2006.01) |
| H02M 3/04 | (2006.01) |
| H02M 3/157 | (2006.01) |
| H02M 3/158 | (2006.01) |
| H02M 1/00 | (2007.01) |

(52) U.S. Cl.
CPC ............... *H02M 3/04* (2013.01); *H02M 3/157* (2013.01); *H02M 3/1584* (2013.01); *H02M 2001/0032* (2013.01); *Y02B 70/16* (2013.01)

(58) Field of Classification Search
USPC ......... 323/241, 246, 267, 271, 272, 274–276, 323/282–285
See application file for complete search history.

(56) References Cited

U.S. PATENT DOCUMENTS

| | | | |
|---|---|---|---|
| 6,680,604 B2 * | 1/2004 | Muratov et al. ............... | 323/285 |
| 7,904,740 B2 * | 3/2011 | Nousiainen ................... | 713/323 |
| 2003/0210022 A1 | 11/2003 | Takemura et al. | |
| 2006/0197509 A1 * | 9/2006 | Kanamori et al. ............. | 323/222 |
| 2008/0129263 A1 * | 6/2008 | Kotikalapoodi et al. ..... | 323/283 |
| 2009/0096528 A1 * | 4/2009 | Nakai et al. ................... | 330/278 |
| 2009/0174389 A1 * | 7/2009 | Osburn ......................... | 323/351 |

(Continued)

FOREIGN PATENT DOCUMENTS

| | | |
|---|---|---|
| JP | 3799324 B2 | 7/2006 |
| JP | 3974449 B2 | 9/2007 |

*Primary Examiner* — Adolf Berhane
*Assistant Examiner* — Gary Nash
(74) *Attorney, Agent, or Firm* — Shapiro, Gabor and Rosenberger, PLLC

(57) ABSTRACT

Provided is a controller that is capable of reducing fall in a waveform of a power supply voltage when the power supply voltage supplied to a CPU is reduced. A controller for controlling voltage regulators includes a differential amplifier that outputs a measurement voltage corresponding to a power supply voltage supplied to a load and an error amplifier having a non-inverting input terminal supplied with a target voltage and an inverting input terminal supplied with a measurement voltage. The error amplifier compares the target voltage and the measurement voltage and outputs a signal for controlling the voltage regulators. Further included in the controller is a correction circuit that applies an offset voltage to the inverting input terminal of the error amplifier when the power supply voltage supplied to the load is reduced.

18 Claims, 15 Drawing Sheets

(56) References Cited

U.S. PATENT DOCUMENTS

| | | | |
|---|---|---|---|
| 2010/0179781 A1* | 7/2010 | Raphael | 702/94 |
| 2010/0207594 A1* | 8/2010 | Davoudi et al. | 323/283 |
| 2011/0062926 A1* | 3/2011 | Qiu et al. | 323/282 |
| 2011/0260703 A1* | 10/2011 | Laur et al. | 323/271 |

* cited by examiner

US 9,276,462 B2

VOLTAGE REGULATOR CONTROLLER AND SYSTEM INCLUDING VOLTAGE REGULATOR CONTROLLER

CROSS-REFERENCE TO RELATED APPLICATIONS

This application is based upon and claims the benefit of priority from Japanese patent application No. 2013-106947, filed on May 21, 2013, the disclosure of which is incorporated herein in its entirety by reference.

BACKGROUND

The present invention relates to a controller and a system including the controller, and in particular, to a controller for controlling power supply to a CPU (Central Processing Unit) and a technique applicable to a system including a CPU and a controller for controlling power supply to the CPU.

Japanese Patent No. 3974449 discloses the power supply apparatus with improved output voltage response. Japanese Patent No. 3799324 discloses the inverter output control circuit used for an induction heating cooking appliance composed of an RISC (Reduced Instruction Set Computer) microcomputer or a DSP (Digital Signal Processor).

SUMMARY

FIG. 1 of Japanese Patent No. 3974449 shows the power supply apparatus including the auxiliary output voltage setting circuit 40 that receives the instruction voltage Vdac and the output voltage Vo and improves the output voltage response. However, Japanese Patent No. 3974449 fails to consider waveform fall when the output voltage is reduced.

Japanese Patent No. 3799324 fails to consider reducing power consumption of the controller that controls power supply.

Other issues and new features will be apparent from description of the specification and attached drawings.

According to an aspect of the present invention, a controller for controlling a voltage regulator that supplies a power supply voltage to a load includes a differential amplifier that outputs a measurement voltage corresponding to the power supply voltage supplied to the load; an error amplifier including an non-inverting input terminal and an inverting input terminal that compares a target voltage and a measurement voltage and controls the voltage regulator, in which the non-inverting input terminal is supplied with the target voltage, and the inverting input terminal is supplied with the measurement voltage; and a correction circuit that applies an offset voltage to the inverting input terminal in response to a change in a voltage value of the power supply voltage supplied to the load.

According to another aspect of the present invention, a DSP performs telemetry processing for measuring, for example, states of power supply supplied to a CPU at a predetermined time interval. The DSP is activated at a predetermined time interval and, upon activation, performs the telemetry processing. After the DSP performs the telemetry processing, the DSP enters a standby state (power-saving mode).

According to the above aspect, it is possible to reduce waveform fall of a power supply voltage when the power supply voltage supplied to the CPU is reduced. It is further possible to reduce power consumption also by measuring the state of the power supply to the CPU at the predetermined time interval.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
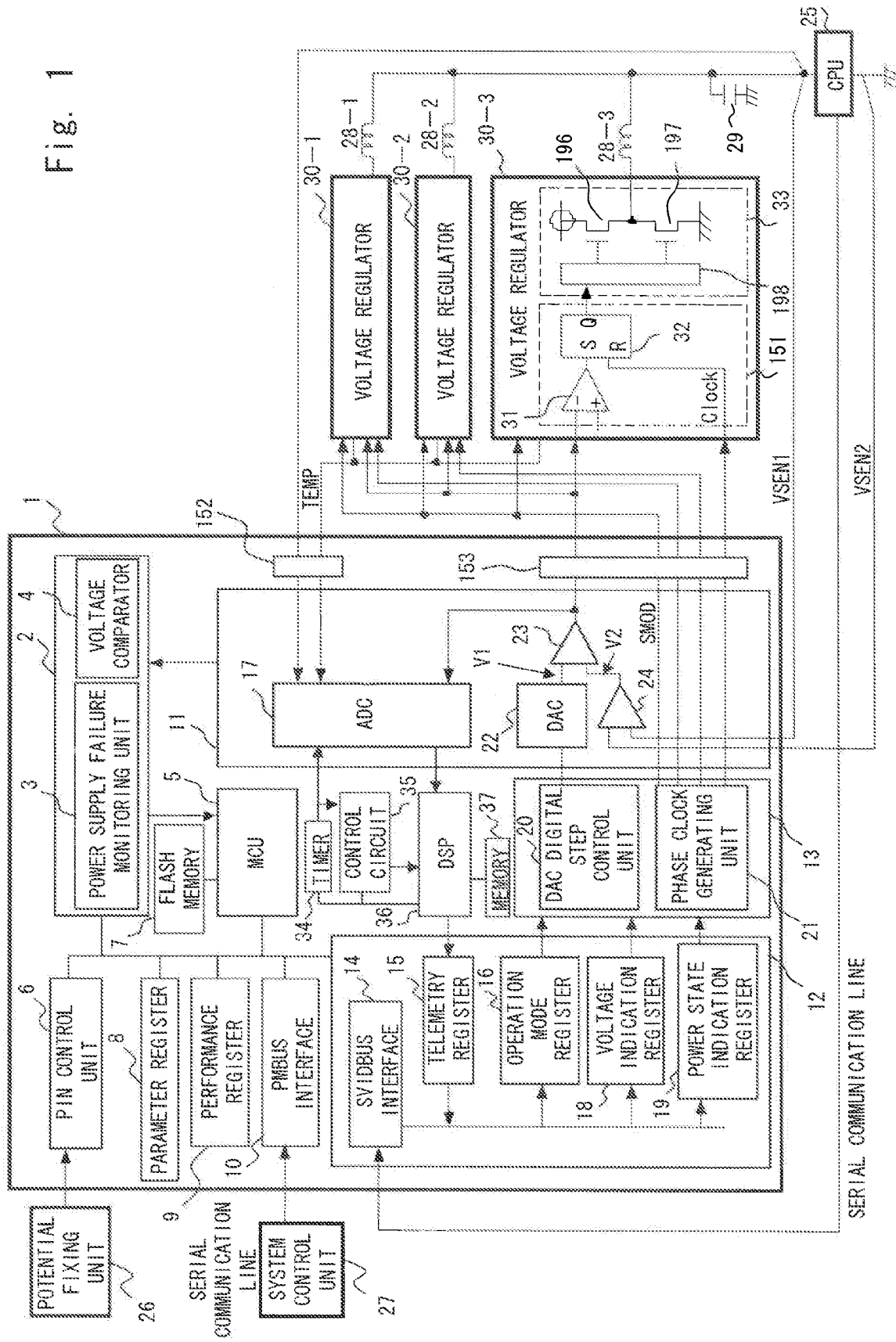
FIG. 1 is a block diagram showing a configuration of a controller and a system using the controller.

First, an outline of an exemplary embodiment below is explained using FIGS. 1 and 12. In the following explanation, parts with the same function are denoted by the same reference numerals, and repeated explanation shall not be provided. Therefore, please refer to the explanation of the parts denoted by the same reference numerals for the parts with no explanation.

In FIG. 1, 25 is a microprocessor (hereinafter referred to as CPU) operating according to a program stored to a memory not shown in the drawings (e.g., DDR memory). The CPU 25 is provided to a so-called notebook personal computer (hereinafter referred to as a notebook PC) and executes an application according to the program, although not especially limited thereto. Notebook PCs are expected to operate on batteries for a long time. The CPU 25 has large power consumption because the CPU 25 executes applications at a high speed and is therefore driven at a relatively high frequency, for example. For example, the battery run-time on a notebook PC can be extended by finely controlling frequency for driving and a power supply voltage of the CPU 25 depending on an application to be executed. A controller 1 is provided in order to finely control the power supply voltage supplied to the CPU 25. The power supply voltage supplied to the CPU 25 is generated by voltage regulators 30-1 to 30-3. The controller 1 controls the voltage regulators 30-1 to 30-3, thereby finely controlling the power supply voltage supplied to the CPU 25 that is a load of the voltage regulators 30-1 to 30-3. The power supply voltage supplied to the CPU 25, which is a load, is generated by coils 28-1 to 28-3, the voltage regulators 30-1 to 30-3, and a capacitor 29. This is explained later in detail. However, for ease of explanation, the power supply voltage supplied to the CPU 25 is explained as being generated by the voltage regulators 30-1 to 30-3. The voltage regulators 30-1 to 30-3 all have the same configuration, as will be described later in detail. Therefore, FIG. 1 shows only the configuration of the voltage regulator 30-3.

(Controller and System)

The controller 1 includes a microcontroller unit (hereinafter referred to as MCU) 5 that operates according to a program stored to a flash memory 7, for example. Further, the controller 1 includes a digital signal processing unit (hereinafter referred to as DSP) 36 that receives, from an analog-to-digital conversion circuit (hereinafter referred to as ADC) 17, digital data corresponding to a value of the power supply voltage and the like that is supplied to the CPU 25 and executes signal processing. The MCU 5 interprets a command supplied from outside the controller 1 and executes processing according to the command. In response to an activation signal from a control circuit 35, the DSP 36 reads a program stored to a memory 37 and operates according to the program that has been read. That is, the DSP 36 executes predetermined signal processing on the digital data corresponding to the value of the power supply voltage and the like. The control circuit 35 generates the above-mentioned activation signal in response to a signal generated by a timer 34 at a predetermined time interval. This activation signal acts as an interrupt signal of the DSP 36 in this exemplary embodiment. Therefore, the DSP 36 operates independently from the MCU 5. The DSP 36 executes the signal processing and then transitions to a standby state, which is explained later using FIG. 2.

The controller 1 further includes a differential amplifier 24 that receives the power supply voltage to the CPU 25 and generates a measurement voltage according to the power supply voltage, and a digital-to-analog conversion circuit (hereinafter, digital-to-analog conversion shall be referred to as DA, and a DA circuit may also be referred to as a DAC) 22 that generates a target voltage which is a voltage to be a target. The controller 1 still further includes an error amplifier 23 that detects a difference between the target voltage and the measurement voltage and controls the voltage regulators 30-1 to 30-3. Such a configuration enables feedback control, so that the power supply voltage supplied to the CPU 25, which is a load, will be a voltage according to the target voltage. As shown in FIG. 1, the controller 1 includes other blocks than those explained above. The other blocks are explained later using FIG. 1 and the like.

Figure 12:
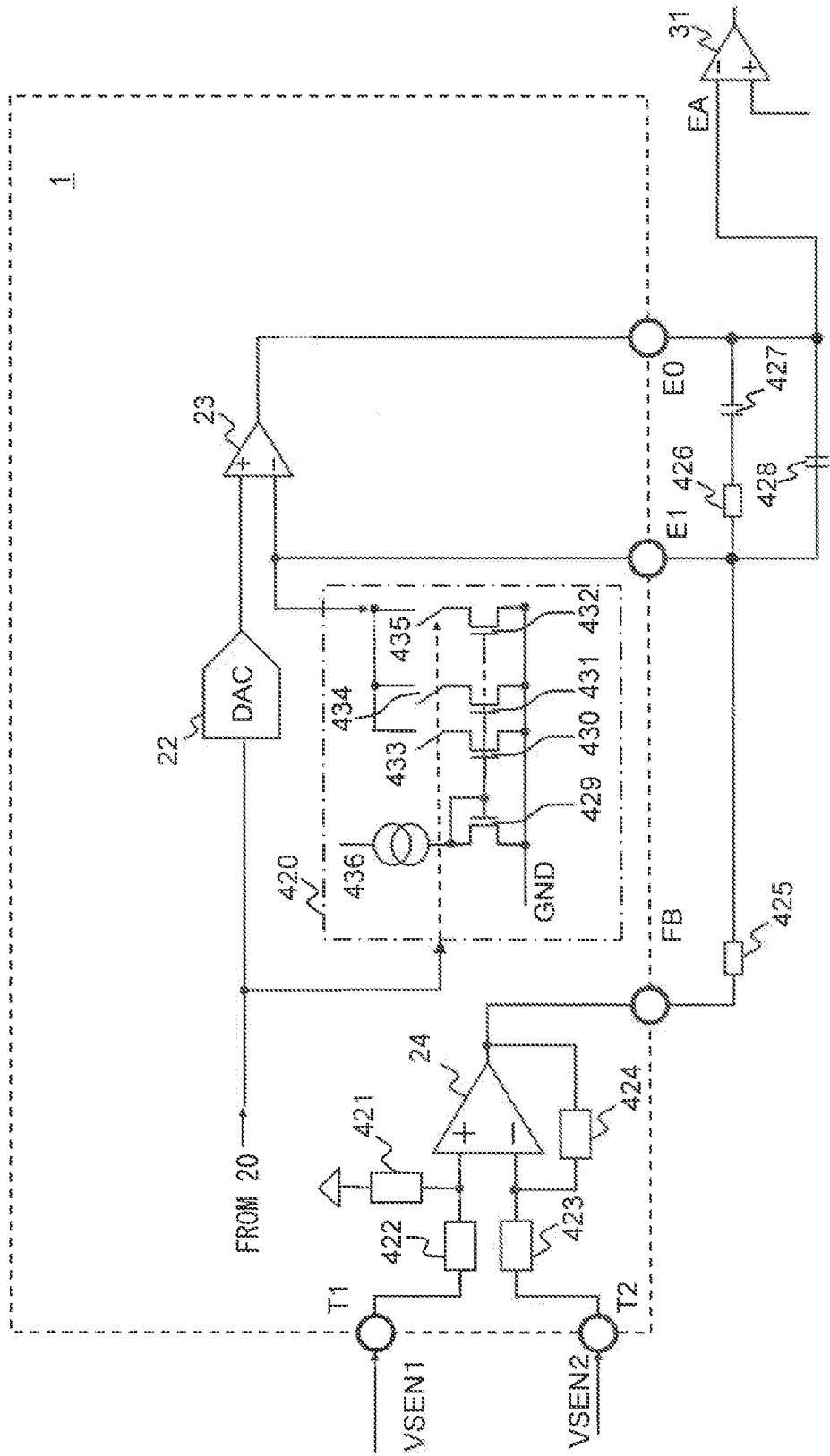
FIG. 12 is a circuit diagram showing a circuit according to the exemplary embodiment.

FIG. 12 shows details of parts related to the error amplifier 23, the differential amplifier 24, and the DAC 22. In FIG. 12, a circuit 420 surrounded by the one-dot chain line is a current DAC. The current DAC 420 passes a current according to supplied digital data, i.e., passes a so-called sink current, to a ground voltage of the circuit. The power supply voltage needs to be quickly reduced to reduce power consumption of a notebook PC. In order to respond to this request, the target voltage output from the DAC 22 is reduced from a relatively high voltage to a low voltage. The feedback control is performed so that the measurement voltage will match the reduced target voltage. Due to a delay in the error amplifier 23, the differential amplifier 24 and the like that are used in the feedback control, the measurement voltage matching the target voltage is applied to an input node of the error amplifier 23 after the power supply voltage becomes a voltage value matching the reduced target voltage. Therefore, waveforms of voltages output from the voltage regulators 30-1 to 30-3 oscillate such that the waveforms falls below the voltage value matching the target voltage and then return to the voltage value matching the target value. When the power supply voltage is reduced, the current DAC 420 operates to draw an output current of the differential amplifier 24 to the ground voltage. Therefore, the measurement voltage, which is output from the differential amplifier 24, is made lower than when the current DAC 420 is not provided and supplied to an inverting input terminal of the error amplifier 23 to thereby reduce the measurement voltage. In other words, an offset voltage is applied to the inverting input terminal of the error amplifier 23 by the current DAC 420. Then, as compared to a case in which no offset voltage is applied, there will be less voltage difference between a non-inverting input terminal (indicated by "+" in the drawing) and the inverting input terminal (indicated by "−" in the drawing) of the error amplifier 23. Accordingly, it is possible to reduce fall in the output voltages from the voltage regulators that are driven by an output from the error amplifier 23. Particularly, it is possible to prevent malfunction of a notebook PC by preventing fall in the power supply voltage below a minimum operating voltage of the CPU 25.

Thus, the DSP 36 can execute the signal processing at a predetermined time interval on a digital signal (an output of the ADC 17) corresponding to the power supply voltage and the like that is supplied to the CPU 25 even in a period when the MCU 5 analyzes a command or executes processing according to an analysis result of the command. This enables confirmation and fine control of the power supply voltage and the like based on a result of the signal processing. As the DSP 36 transitions to the standby state after the signal processing, the power consumption of the controller 1 can be reduced. Note that the signal processing may be executed by the MCU 5 in place of the DSP 36. However when the analysis of a command or processing according to the analysis result and the signal processing temporally overlap, either of the processing is delayed, thereby generating a delay in a response to a command or generating limitation in the fine control.

Embodiment

FIG. 1 shows a block configuration of a system according to this exemplary embodiment. The system according to this exemplary embodiment includes the controller 1, the voltage regulators 30-1 to 30-3, and the CPU 25 that is supplied with voltages from the voltage regulators. In FIG. 1, the controller 1 surrounded by the solid line is formed on one semiconductor chip.

The controller 1 includes a PIN control unit 6, the flash memory 7, a parameter register 8, a performance register 9, the MCU 5, a PMBUS (Power Management Bus) interface 10, and an SVID (Serial VID) command evaluating circuit 12. The controller 1 further includes a hard logic power supply control circuit 13, an analog power supply control circuit 11, a power failure monitoring circuit 2, an input unit 152, an output unit 153, the DSP 36, the control circuit 35, the timer 34, and the memory 37.

The above-mentioned SVID command evaluating circuit 12 includes an SVIDBUS interface (hereinafter may be referred to as an SVID interface) 14, an operation mode register 16, a voltage indication register 18, a power state indication register 19, and a telemetry register 15. Moreover, the input unit 152 is supplied with temperature information (indicated by TEMP in FIG. 1) from the voltage regulators 30-1 to 30-3 and a power supply voltage VSEN1 to be supplied to the CPU 25 through signal lines. That is, the input unit 152 is supplied with a monitoring voltage for monitoring the power supply voltage supplied to the CPU and the temperature information. The output unit 153 outputs signals from the controller 1 to the voltage regulators 30-1 to 30-3. Although not limited thereto, the CPU 25 is composed of one semiconductor chip, receives the voltages output from the voltage regulators 30-1 to 30-3 as the power supply voltage, and performs various processing according to a program stored to a memory not shown in the drawings. The CPU 25 transmits an instruction to the controller 1 via the SVID interface 14. A plurality of voltages are supplied to the PIN control unit 6 from an external potential fixing unit 26. The PIN control unit 6 evaluates a combination of the plurality of fixed voltages, and outputs, to the MCU 5, configuration information indicating how external terminals (not shown in the drawings) of the controller 1 are configured. That is, usage of the external terminals is determined by the combination of fixed voltages. Selection of system information is also made by a combination of the plurality of voltages supplied to the PIN control unit 6. For example, values of a performance register and a parameter register that are explained later can be changed per model using the combination of the plurality of voltages.

The flash memory 7 stores in advance a program to be executed by the MCU 5 (a MCU program) and a program to be executed by the DSP 36 (a DSP program). For example, in the case of a change in the power supply standard, the controller 1 reflecting the change can be provided by changing the program stored to the flash memory 7, thereby eliminating the need to redevelop the device. The flash memory 7 stores a table for a plurality of parameters that define initial values of a maximum allowable voltage value, a maximum allowable temperature, and a maximum allowable current, for example. When the controller 1 is powered on, the MCU 5 transfers, to the memory 37, the DSP program stored to the flash memory 7.

The parameter register 8 stores an amount of change (a step voltage) in voltage values by steps in the digital step control via the SVID interface 14 and a value of ΔV. The value of ΔV is a difference between an indication voltage, which is a final voltage to reach while reducing the voltage in a discharge mode, and a target voltage Vs, which is a voltage at the time of exiting the discharge mode before reaching the indication voltage.

The performance register 9 receives and stores data such as the maximum allowable voltage value, the maximum allowable temperature, and the maximum allowable current that are stored to the flash memory 7.

The maximum allowable voltage value stored to the performance register 9 is a maximum power supply voltage that can be applied to the CPU 25. Moreover, the maximum allowable temperature is compared with temperatures measured by the voltage regulators 30-1 to 30-3 and the like and indicates a maximum temperature allowed when the CPU 25, the voltage regulators or the like operate. The maximum allowable current is a maximum current value in which the voltage regulators can supply. When actual values exceed these values stored to the performance register 9, the controller 1 outputs an indication signal to the voltage regulators 30-1 to 30-3 in order to reduce the values.

The MCU 5 performs processing based on the MCU program stored to the flash memory 7. Temporal data generated during the processing is written to or read from a memory not shown in the drawings.

The PMBUS interface 10 transmits and receives signals to and from an external system control unit 27. At this time, transmission and reception of the signals is performed in series through a signal communication line. The SVID interface 14 transmits and receives signals to and from the CPU 25 through a signal communication line.

The operation mode register 16 stores a current operation mode. There are a normal mode, the discharge mode and the like as the operation mode. Those modes are explained later in detail. The voltage indication register 18 stores a value of the indication voltage during voltage control. The power state indication register 19 stores an indication value of a power state mode during power state control.

The telemetry register 15 stores a digital signal DV, which represents the output voltages from the voltage regulators 30-1 to 30-3, a digital signal DT, which represents temperatures inside the voltage regulators 30-1 to 30-3, and a digital signal DI, which represents a current value to be supplied to the voltage regulators 30-1 to 30-3.

The hard logic power supply control circuit 13 includes a DAC (digital-to-analog conversion) digital step control unit 20 and a phase clock generating unit 21. The DAC digital step control unit 20 determines a voltage change value in each step to reach an indication voltage over a plurality of steps and outputs the determined voltage change values as the digital signal DV. The phase clock generating unit 21 activates a control signal SMOD for the voltage regulators 30-1 to 30-3 to operate and outputs a clock having a phase to the voltage regulators 30-1 to 30-3 to operate. The phase clock generating unit 21 deactivates the control signal SMOD for the voltage regulator 30-1 to 30-3 to stop.

The analog power supply control circuit 11 includes the digital-to-analog conversion circuit (hereinafter referred to as DAC) 22, the differential amplifier 24, the error amplifier 23, and the ADC 17. The DAC 22 converts the digital signal DV output from the DAC digital step control unit 20 into an analog voltage V1. The differential amplifier 24 amplifies a difference between the voltage VSEN1 of a high-potential side of the CPU 25 and a voltage VSEN2 of a low-potential side of the CPU 25. That is, the differential amplifier 24 amplifies and outputs the power supply voltage (i.e., a difference voltage between the voltage of the high-potential side and the voltage of the low-potential side) to the CPU 25. The error amplifier 23 amplifies a difference between the voltage V1 output from the DAC 22 and the voltage V2 output from the differential amplifier 24. The amplified voltage output from the error amplifier 23 is supplied to the voltage regulators 30-1 to 30-3 as a voltage representing a difference between the indication voltage and the power supply voltage currently supplied to the CPU 25. The ADC 17 performs AD (analog-to-digital) conversion on the output voltages of the voltage regulators 30-1 to 30-3 and the temperature TEMP.

The power failure monitoring circuit 2 includes a voltage comparator 4 and a power failure monitoring unit 3. The voltage comparator 4 receives the power supply voltage VSEN1, which is supplied from the input unit 152 to the CPU 25, as an analog voltage, and compares the power supply voltage VSEN1 with a predetermined voltage (which is a predetermined voltage evaluated as abnormal) in analog processing. The power failure monitoring unit 3 monitors whether or not the power supply voltage supplied to the CPU 25 is abnormal according to an output from the voltage comparator 4.

The voltage regulators 30-1 to 30-3 supply the power supply voltage supplied to the CPU 25. In this exemplary embodiment, each of the regulators 30-1 to 30-3 is included in one semiconductor package and has similar configuration to each other, although not limited thereto. Here, a detailed circuit configuration is illustrated only for the voltage regulator 30-3 as a representative. Further, operations and the like are explained only for the representative voltage regulator 30-3, and the other voltage regulators 30-1 to 30-2 shall not be explained for the operations and the like.

In one semiconductor package (the voltage regulator 30-3), three semiconductor chips are sealed. In each of the semiconductor chips, a high-side MOS transistor 196, a low-side MOS transistor 197, and other parts (PWM (Pulse Width Modulation) unit 151 and a MOS control unit 198) are formed. Note that the high-side MOS transistor 196 is connected between the output of the voltage regulator 30-3 and the power supply voltage (indicated by a circle in the drawing). The low-side MOS transistor 197 is connected between the output of the voltage regulator 30-3 and the ground voltage.

The MOS control unit 198 and the MOS transistors 196 and 197 convert voltages. Thus the MOS control unit 198 and the MOS transistors 196 and 197 can be regarded to constitute a DC-DC converter 33. The voltage regulator 30-3 operates when the control signal SMOD is activated and stops operating when the control signal SMOD is deactivated.

The above-mentioned PWM unit 151 includes a PWM comparator 31 and a latch circuit 32. The PWM comparator 31 outputs a PWM signal based on an error signal output from the error amplifier 23. The output of the PWM comparator 31 is input to a set terminal S of the latch circuit 32. A clock, which is an output of the phase clock generating unit 21, is supplied to a reset terminal R of the latch circuit 32. In response to an output from the latch circuit 32, the DC-DC converter 33 supplies the power supply voltage supplied to the CPU 25. That is, the PWM signal output from the latch circuit 32 controls the DC-DC converter 33.

When the high-side MOS transistor 196 is turned on and the low-side transistor 197 is turned off by the PWM signal output from the latch circuit 32, the voltage VSEN1 of the high-potential side of the CPU 25 increases via the coil 28-3. On the other hand, when the high-side MOS transistor 196 is turned off and the low-side MOS transistor 197 is turned on by the PWM signal output from the latch circuit 32, the voltage VSEN1 is reduced via the coil 28-3. Note that the capacitor 29 is provided at a common node of the coils 28-1 to 28-3 so as to stabilize the voltage VSEN1.

(Normal Mode)

A case is explained next in which the normal mode is set to the above-mentioned operation mode register 16 as the operation mode.

In the normal mode, the high-side MOS transistor 196 and the low-side MOS transistor 197 are controlled to turn on and off such that the voltage VSEN1 of a CPU voltage line becomes constant. That is, when the voltage is low, the high-side MOS transistor 196 is turned on (and the low-side MOS transistor 197 is turned off at this time) to increase the power supply voltage supplied to the CPU 25. When the power supply voltage is high, the low-side MOS transistor 197 is turned on (and the high-side MOS transistor 196 is turned off at this time) to reduce the voltage.

In this exemplary embodiment, outputs of the three voltage regulators 30-1 to 30-3 are connected to the capacitor 29 via the coils 28-1 to 28-3. It is possible to supply a power supply voltage with less ripple to the CPU 25 by turning on and off the high-side MOS transistor 196 and the low-side MOS transistor 197 at different phases (timings) (e.g., different by 120 degrees). It is obvious that the phase is not necessarily three phases. For example, in a desktop PC or a server PC with a relatively high load, there may be more phases such as four to eight phases. Further, in a tablet PC and a notebook PC with a relatively low load, the phase may be one to three phases.

(Discharge Mode)

Next, a case is explained in which the discharge mode is set to the operation mode register 16.

In the discharge mode, while the DC-DC converter 33 is maintained in an off state, charges in the CPU 25 and the like are discharged, thereby reducing the voltage VSEN1 of the CPU voltage line to a particular voltage. In other words, the discharge mode is not the mode to increase the voltage when the power supply voltage is low by turning on the high-side MOS transistor 196 (and turning off the low-side MOS transistor 197), or to reduce the voltage when the voltage is high by turning on the low-side MOS transistor 197 (and turning off the high-side MOS transistor 196) in order to keep the voltage constant. That is, the discharge mode is not the mode to control the power supply voltage of the CPU 25 to be constant by turning on and off the MOS transistors 196 and 197 using the DC-DC converter 33. Note that as long as the DC-DC converter 33 is turned off, the voltage regulator 30 may be turned off to turn off the DC-DC converter 33.

In FIG. 1, 36 is the DSP and 37 is the memory connected to the DSP 36. Moreover, 34 is the timer and 35 is the control circuit. The program to be executed by the DSP 36 is transferred from the flash memory 7 to the memory 37.

When the controller 1 is powered on, the MCU 5 starts operating according to the program (the MCU program) stored to the flash memory 7. In this operation, the MCU 5 configures the registers and transfers, to the memory 37, the DSP program stored to the flash memory 7. Moreover, the MCU 5 starts operating according to the MCU program so as to boost the power supply voltage supplied to the CPU 25. When the power supply voltage reaches a predetermined value, the MCU 5 activates the DSP 36. Then, the DSP 36 starts operating according to the DSP program stored to the memory 37.

The DSP 36 starts the timer 34 and then transitions to a power-saving mode (standby state) according to the DSP program. After an elapse of a predetermined time set to the timer 34, an activation signal is generated from the timer 34. The ADC 17 starts operating in response to this activation signal. When the ADC 17 starts operating, the analog voltage and the analog temperature from the input unit 152 are converted into digital signals. The activation signal generated from the timer 34 is supplied to the control circuit 35. The control circuit 35 detects this activation signal and generates an interrupt request to the DSP 36. In response to the interrupt request, the DSP 36 transitions from the standby state (the power-saving mode) to an operating state and executes the DSP program (which is stored to the memory 37) according to the interrupt request. The DSP program executed here is a program for telemetry processing, which is explained later in detail. When the DSP 36 completes execution of the DSP program for the telemetry processing, the DSP 36 transitions to the standby state again and waits until another activation signal is supplied from the control circuit 35. After the ADC 17 receives the activation signal and completes analog-to-digital conversion, supply of a clock signal for analog-to-digital conversion to the ADC 17 will stop and the ADC 17 will be in the standby state until an activation signal is supplied again. As described above, when the predetermined operations are completed (the operation for telemetry processing and the analog-to-digital conversion operation), the DSP 36 and the ADC 17 transition to the standby state, thereby reducing the power consumption. On the other hand, the timer 34 generates the activation signal periodically (at a predetermined time interval), thus the telemetry processing can be executed at the predetermined time interval. In order for the timer 34 to generate the activation signal at the predetermined time interval, predetermined time may be set to the timer 34 in advance as a fixed value. Alternatively, the predetermined time may be incorporated in the DSP program or the MCU program, so that when the DSP 36 is activated by the MCU 5, the predetermined time may be set to the timer 34 by the DSP 36, or the timer 34 may be configured when the MCU 5 is activated. In any case, the timer 34 generates the activation signal periodically at a predetermined interval.

Next, the telemetry processing is explained. The telemetry processing (operation) is to periodically examine state information such as a voltage state of the CPU 25. The examined data is held in the controller. The CPU 25 and the system control unit 27 can retrieve the data from the controller. It is desirable to perform the telemetry processing periodically at a shorter time interval in order to obtain detailed states of the power supply voltage and the like.

In response to the activation signal, the ADC 17 is supplied with a clock signal for analog-to-digital conversion and starts operating. By a clock signal for analog-to-digital conversion (hereinafter referred to as AD conversion), the ADC 17 receives a signal from the input unit 152 at a first timing by every μsec order of magnitude, performs AD conversion on the output voltages (the power supply voltage VSEN1) of the voltage regulators 30-1 to 30-3, and outputs, to the DSP 36, a digital signal DV' obtained from the conversion.

Moreover, the ADC 17 receives the output from the error amplifier 23 at a second timing by every μsec order of magnitude by the clock signal for AD, performs AD conversion on a voltage value (which is output from the error amplifier 23) representing a current value supplied to the voltage regulators 30-1 to 30-3, and outputs an obtained digital signal DI' to the DSP 36.

The ADC 17 also receives a temperature signal (TEMP) from the input unit 152 at a third timing by every μsec order of magnitude by the clock signal for AD, performs AD conversion on voltage values representing temperatures output from temperature chips (not shown in the drawings) inside the voltage regulators 30-1 to 30-3, and outputs an obtained signal DT' to the DSP 36.

Next, the DSP 36 executes predetermined signal processing on the above-mentioned digital signals DV, DI, and DT and updates the digital information (signals) DV, DI, and DT that are stored to the telemetry register 15 to the latest information.

The CPU 25 or the MCU 5 reads the digital information DV, DI, and DT (the information DV regarding the power supply voltage, the information DI regarding the current, and the information DT regarding the temperature) stored to the telemetry register 15 as necessary.

As described above, in response to the activation signal from the timer 34 and the control circuit 35, the controller 1 periodically retrieves the information regarding the power supply voltage and the like of the voltage regulators 30-1 to 30-3 and the CPU 25. Further, the DSP 36 periodically executes the signal processing on the retrieved information and stores the processed information to the telemetry register 15. As the signal processing is executed using the DSP program, the characteristics of the telemetry operation can be easily changed by changing the program or parameters. For example, a difference may arise between a temperature managed by the system and a temperature in the actual implementation. Even in such a case, a parameter regarding the temperature, for example, a maximum temperature, can be changed according to the actual implementation. In this way, the telemetry operation can be configured to suit the actual implementation.

This exemplary embodiment explained the example of periodically checking a plurality of pieces of information such as an output voltage, an output current, and a temperature, however it is obvious that only one piece of the information may be periodically checked.

(SVIDBUS Interface)

Next, an operation via the SVIDBUS interface is explained. As for the operation, voltage control and power state control is explained.

(Voltage Control)

Figure 3:
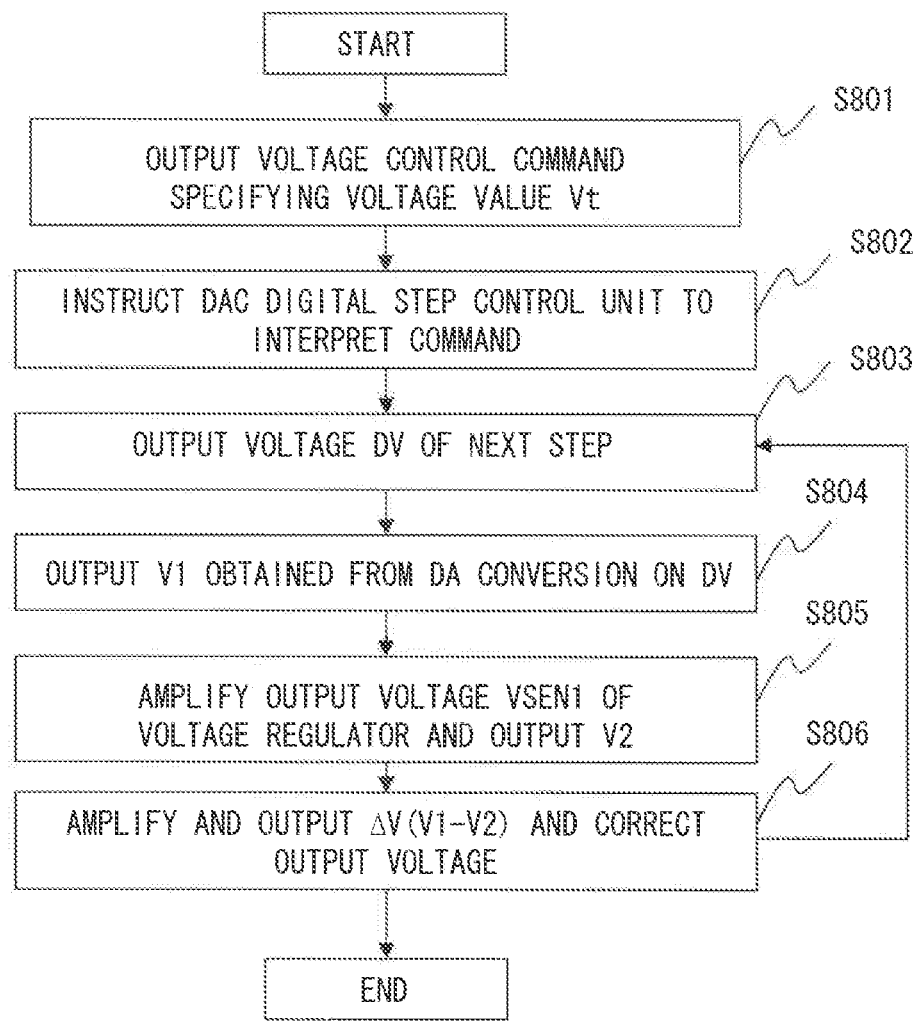
FIG. 3 is a flowchart showing a procedure of a voltage control operation.

FIG. 3 is a flowchart showing a procedure of a voltage control operation. The CPU 25 outputs a voltage control command specifying a voltage value Vt to a serial communication line (Step S801). The SVIDBUS interface 14 interprets the command received from the serial communication line and instructs the DAC digital step control unit 20 to perform voltage control (Step S802). The DAC digital step control unit 20 uses the specified normal indication voltage Vt as a target value and outputs a digital voltage DV of the next step in order to reach the target value (Step S803). The DAC 22 converts the digital DV into the analog voltage V1 (Step S804). The differential amplifier 24 amplifies a difference between the voltage VSEN1 of the high-potential side of the CPU 25 and the voltage VSEN2 of the low-potential side of the CPU 25 and outputs the voltage V2 (Step S805). The error amplifier 23 amplifies a difference between the voltage V1 output from the DAC 22 and the voltage V2 output from the differential amplifier 24 and outputs the amplified voltage to the voltage regulators 30-1 to 30-3 as a voltage representing a difference between the specified voltage and a current voltage of the CPU 25. The voltage regulators 30-1 to 30-3 correct voltages to output based on the voltage output from the error amplifier 23 (Step S806).

For example, when the voltage VSEN1 of the high-potential side is lower than the normal indication voltage Vt, the high-side MOS transistor 196 is turned on to increase the voltage VSEN1 of the high-potential side. On the other hand, when the voltage VSEN1 of the high-potential side is greater than the normal indication voltage Vt, the low-side MOS transistor 197 is turned on to reduce the voltage VSEN1 of the high-potential side. After that, the process returns to Step S803 and repeats the operation. In this way, the voltage VSEN1 of the high-potential side is controlled to be the normal indication voltage Vt. As described so far, the voltage control operation is performed via the hard logic power supply control circuit 13 without involving the MCU 5, thereby speeding up the operation. It is thus possible to achieve a high-speed operation.

(Power State Control)

Figure 4:
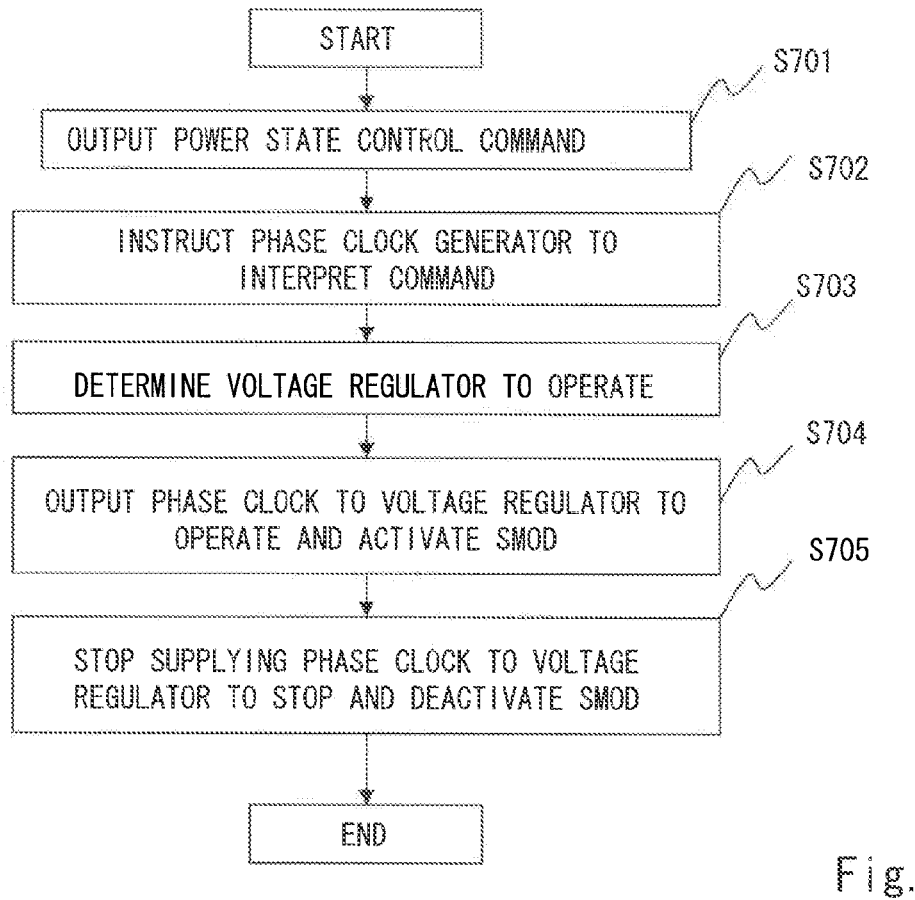
FIG. 4 is a flowchart showing a procedure of a power state control operation.

The power state control is to set and control the number of voltage regulators to operate among a plurality of voltage regulators. The power state mode is switched according to the size of a current consumed by the CPU. FIG. 4 is a flowchart showing a procedure of a power state control operation.

The CPU 25 outputs a power state control command to a serial communication line (Step S701). The SVIDBUS interface 14 interprets the command received from the serial communication line and instructs the phase clock generating unit 21 to perform the power state control (Step S702). The phase clock generating unit 21 determines the voltage regulators 30-1 to 30-3 to operate and a phase of a phase clock to the voltage regulators 30-1 to 30-3 to operate. For example, when "0" is specified to the power state mode, the power state mode "0" is stored to the power state indication register 19. In order to supply a load current to the CPU 25, the phase clock generating unit 21 selects the plurality of voltage regulators 30-1 to 30-3 to operate and determines phases of clocks to be supplied to the voltage regulators 30-1 to 30-3.

When "0" is specified to the power state mode, usually a load current is large, and thus often requiring highly accurate voltage stability. For this reason, the power state control is processed periodically at a high speed. Further, when "1" is specified to the power state mode, the power state modes "1" are stored to the power state indication register 19. The phase clock generating unit 21 selects one of the voltage regulators 30-1 to 30-3 to operate and determines a phase of a clock to be supplied to the selected voltage regulator. When "1" is specified to the power state mode, a load current is often small. For this reason, the power state control is periodically processed but the power consumption of the voltage regulator is smaller than when the power state mode is "0". Furthermore, when "2" is specified to the power state mode, the power state modes "2" are stored to the power state indication register 19. The phase clock generating unit 21 selects one of the voltage regulators 30-1 to 30-3 to operate. In order to supply a load current, the phase clock generating unit 21 determines a phase of a clock to be supplied to the voltage regulator when the voltage droops less than or equal to a specified voltage (which is stored to the parameter register 8 in a different command by the CPU 25) (Step S703). When "2" is specified to the power state mode, usually a load current is smaller than when the power state mode is "2". For this reason, the power state control is processed irregularly only while the voltage is reduced, thereby reducing the power consumption of the voltage regulator more than when the power state mode is "1".

The phase clock generating unit 21 activates the control signal SMOD for one or a plurality of the voltage regulators 30-1 to 30-3 to operate and outputs the clock having the determined phase to the voltage regulators 30-1 to 30-3 to operate. In response to the activated control signal SMOD, the voltage regulators 30-1 to 30-3 output a voltage based on the clock transmitted from the phase clock generating unit 21 (Step S704).

The phase clock generating unit 21 deactivates the control signal SMOD for one or the plurality of the voltage regulator 30-1 to 30-3 to stop. In response to the deactivated control signal SMOD, the voltage regulator 30-1 to 30-3 stop outputting the voltage (Step S705).

As described above, the voltage regulators perform the operation according to the specified power state mode in response to the power state control command. In FIG. 4, the step of activating SMOD and the step of deactivating SMOD are shown as different steps, which are Steps 704 and 705 respectively. FIG. 4 shows the case when there are a voltage regulator to operate and a voltage regulator to stop. Specifically, it is not intended that, in FIG. 4, a voltage regulator is operated in Step 704, and after that, the same voltage regulator is stopped in Step 705.

(PMBUS Interface)

Control via the PMBUS interface 10 is explained below. Communication via the PMBUS is performed by serial communication. In a similar manner as the communication via the SVIDBUS interface 14, the PMBUS is supplied, from the system control unit 27, with a command and the like for performing power supply control and power state control. For the purpose of simplified illustration in the drawings, FIG. 1 does not illustrate connections between the MCU 5 and other connections.

(Voltage Control)

Figure 5:
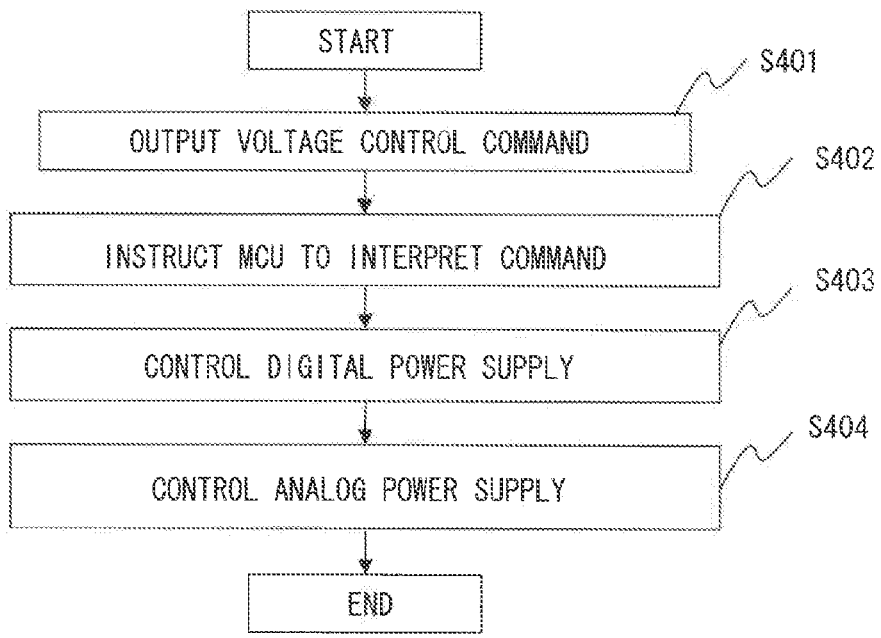
FIG. 5 is a flowchart showing a procedure for executing an instruction via PMBUS.

FIG. 5 is a flowchart showing a procedure of executing a command via the PMBUS. The system control unit 27 outputs a voltage control command specifying a voltage value Vt to the PMBUS (Step S401). The PMBUS interface 10 interprets the command received from the PMBUS and instructs the MCU 5 to perform voltage control (Step S402). The MCU 5 instructs the DAC digital step control unit 20 to perform the voltage control. The DAC digital step control unit 20 uses the specified normal indication voltage Vt as a target value and outputs the digital voltage DV of the next step in order to reach the target value (Step S403). The DAC 22 converts the digital DV into the analog voltage V1 (Step S404). The differential amplifier 24 amplifies a difference between the voltage VSEN1 of the high-potential side of the CPU 25 and the voltage VSEN2 of the low-potential side of the CPU 25 and outputs the voltage V2. The error amplifier 23 amplifies a difference between the voltage V1 output from the DAC 22 and the voltage V2 output from the differential amplifier 24 and outputs the amplified voltage to the voltage regulators 30-1 to 30-3 as a voltage representing a difference between the specified voltage and a current voltage of the CPU 25. The voltage regulators 30-1 to 30-3 correct voltages to output based on the voltage output from the error amplifier 23. For example, when the voltage VSEN1 of the high-potential side is lower than the normal indication voltage Vt, the high-side MOS transistor 196 is turned on to increase the voltage VSEN1 of the high-potential side. On the other hand, when the voltage VSEN1 of the high-potential side is greater than the normal indication voltage Vt, the low-side MOS transistor 197 is turned on to reduce the voltage VSEN1 of the high-potential side. After that, the process returns to Step S403 and repeats the operation.

The PMBUS interface 10 is not used only for the above-mentioned power supply voltage control but also used for supplying a command from the system control unit 27 to the MCU 5. Therefore, when the system control unit 27 issues a specific request, the PMBUS interface 10 generates an interrupt request to the MCU 5. The MCU 5 interprets the interrupt request and performs processing according to the result of the interpretation. An ACK/NACK response to the interrupt request is also transmitted to the system control unit 27 via the PMBUS interface 10. A plurality of types of commands are supplied to the MCU 5. As the processing performed according to the command, there is processing of reading and rewriting parameters from the registers such as rewriting the performance register 9, reading the telemetry register 15, rewriting the voltage indication register 18, and rewriting the power state indication register 19. It is obvious that the types of commands may be added according to user's demand. Such processing is irregularly generated from the system control unit 27 even while the power supply voltage control and the like is performed using the SVIDBUS interface 14.

(Telemetry Operation)

Figure 6:
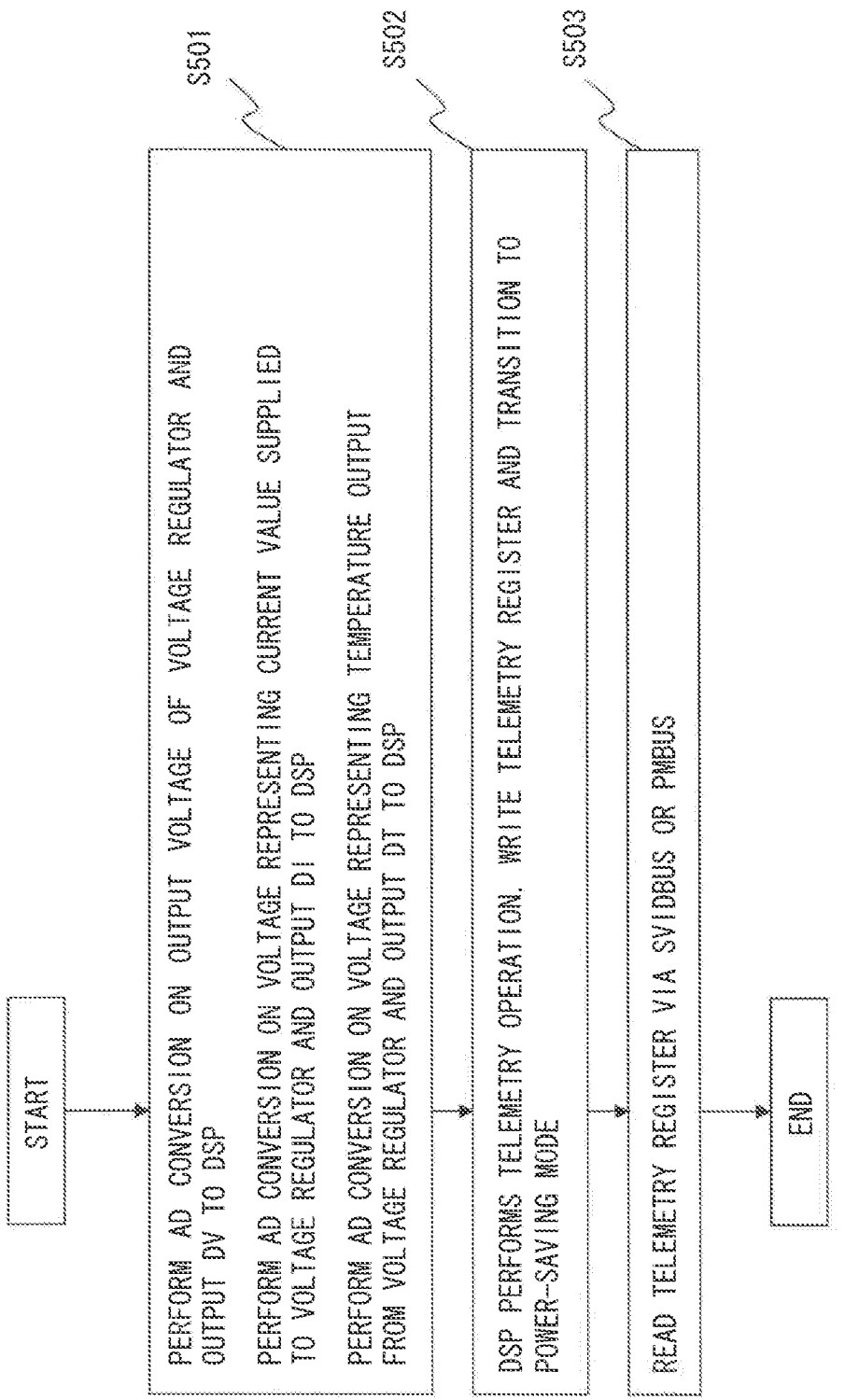
FIG. 6 is a flowchart showing a procedure of a telemetry operation.

FIG. 6 is a flowchart showing a procedure of a telemetry operation. The ADC 17, at a first timing by every μsec order of magnitude, performs AD conversion on the output voltages of the voltage regulators 30-1 to 30-3 and outputs the digital signal DV' to the DSP 36. Further, the ADC 17, at a second timing by every μsec order of magnitude, performs AD conversion on the voltage value representing the current value to be supplied to the voltage regulators 30-1 to 30-3 and outputs the digital signal DI' to the DSP 36. Furthermore, the ADC 17, at a third timing by every μsec order of magnitude, performs AD conversion on the voltage values representing the temperatures output from the temperature chips inside the voltage regulators 30-1 to 30-3 and outputs the digital signal DT' to the DSP 36 (Step S501).

Next, the DSP 36 executes predetermined processing on the digital signal DV' according to the program stored to the memory 37 and outputs an execution result to the telemetry register 15 as a latest digital signal DV. The DSP 36 executes predetermined processing on the digital signal DI' according to the program stored to the memory 37 and outputs an execution result to the telemetry register 15 as a latest digital signal DI. The DSP 36 executes predetermined processing on the digital signal DT' according to the program stored to the memory 37 and outputs an execution result to the telemetry register 15 as a latest digital signal DT (Step S502). After the DSP 36 outputs the execution results to the telemetry register 15, the DSP 36 transitions to the power-saving mode according to the program.

Next, the digital signal DV, the digital signal DI, and the digital signal DT that are stored to the telemetry register 15 are read by the CPU 25 via the SVIDBUS. Alternatively, the MCU 5 reads the values of the telemetry register 15 and supplies the values to the system control unit 27 via the PMBUS interface 10 as described above (Step S503).

Figure 2:
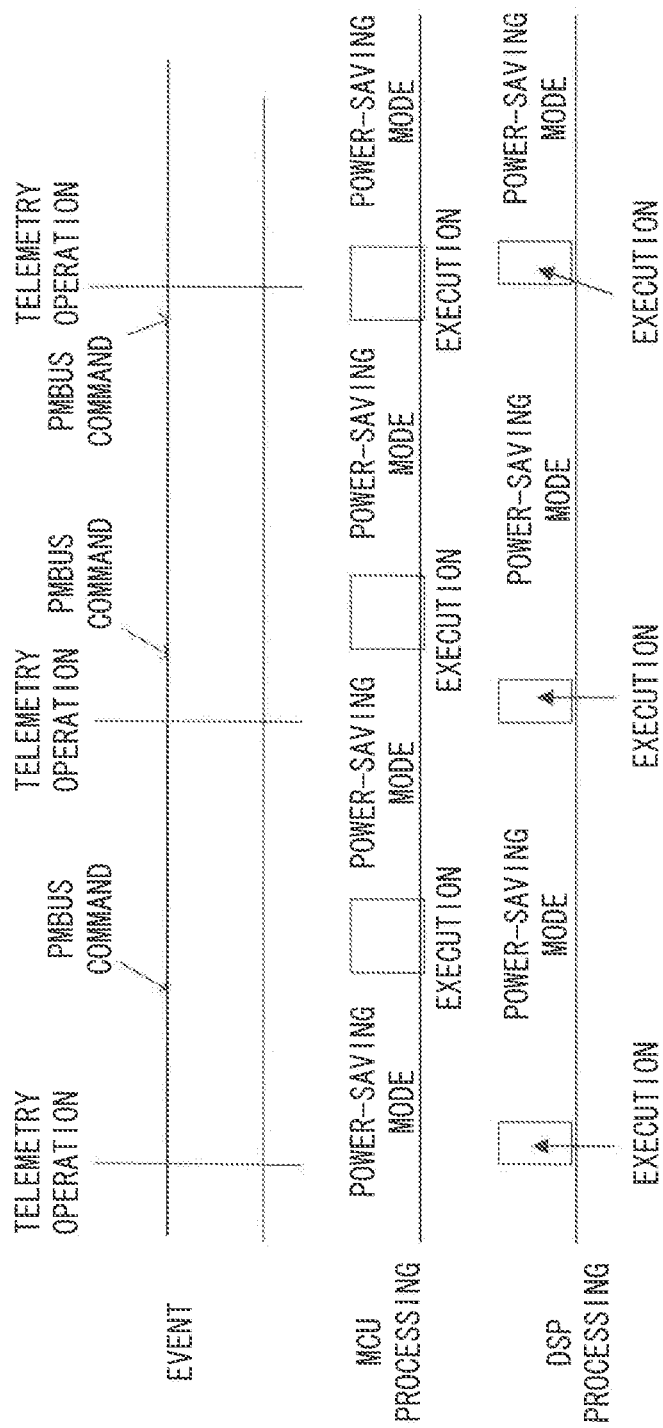
FIG. 2 is a timing chart for explaining processing of MCU and DSP.

FIG. 2 is a timing chart showing a relationship between the telemetry operation and interrupt processing supplied from the PMBUS interface 10 to the MCU 5.

As mentioned above, the interrupt signal is periodically supplied from the control circuit 35 to the DSP 36. In response to the interrupt signal, the DSP 36 executes signal processing (on each of data DV, DI, and DT supplied from the ADC 17) that is indicated as the telemetry operation in FIG. 2. On the other hand, in response to the request supplied from the PMBUS interface 10, the MCU 5 performs processing according to the interrupt request that is indicated as a PMBUS command in FIG. 2. In this exemplary embodiment, the MCU 5 and the DSP 36 are separated (e.g., buses of the MCU 5 and the DSP 36 are separated as shown in FIG. 1) and independently operate from each other. That is, the MCU 5 operates according to the program stored to the flash memory 7, and the DSP 36 operates according to the program stored to the memory 37. Accordingly, as shown in FIG. 2, even when analysis and execution of the PMBUS command supplied from the system control unit 27 temporally overlaps with the telemetry operation, all of the processing can be performed. This enables prevention of communication errors caused by a delay in transmitting ACK to the system control unit 27. The telemetry operation can be periodically performed by the configuration such that the request from the system control unit 27 is given with a higher priority than processing of the telemetry operation, thereby enabling more accurate measurement of the power supply voltage, the power supply current, and the temperature. As the examples of the PMBUS command, there are a command for writing and reading to and from the above-mentioned registers (e.g., the operation register 16) and a command for performing the voltage control using the PMBUS.

In response to the interrupt request from the system control unit 27, the DSP program is created such that after the DSP 36 receives the interrupt request from the system control unit 27 and performs the telemetry operation, the DSP 36 transitions to the power-saving mode. Therefore, as shown in FIG. 2, when the processing is completed, the DSP 36 transitions to the power-saving mode. Further, when the DSP 36 transitions to the power-saving mode, supply of the clocks for AD conversion to the ADC 17 is stopped, thereby reducing the power consumption of the ADC 17. On the other hand, as the MCU 5 does not perform the telemetry operation, the MCU program is created such that after the MCU 5 performs processing according to the PMBUS command, the MCU 5 transitions to the power-saving mode. Thus, after the MCU 5 performs the processing according to the command, the MCU 5 also transitions to the power-saving mode as shown in FIG. 2, thereby reducing the power consumption of the MCU 5.

Figure 7:
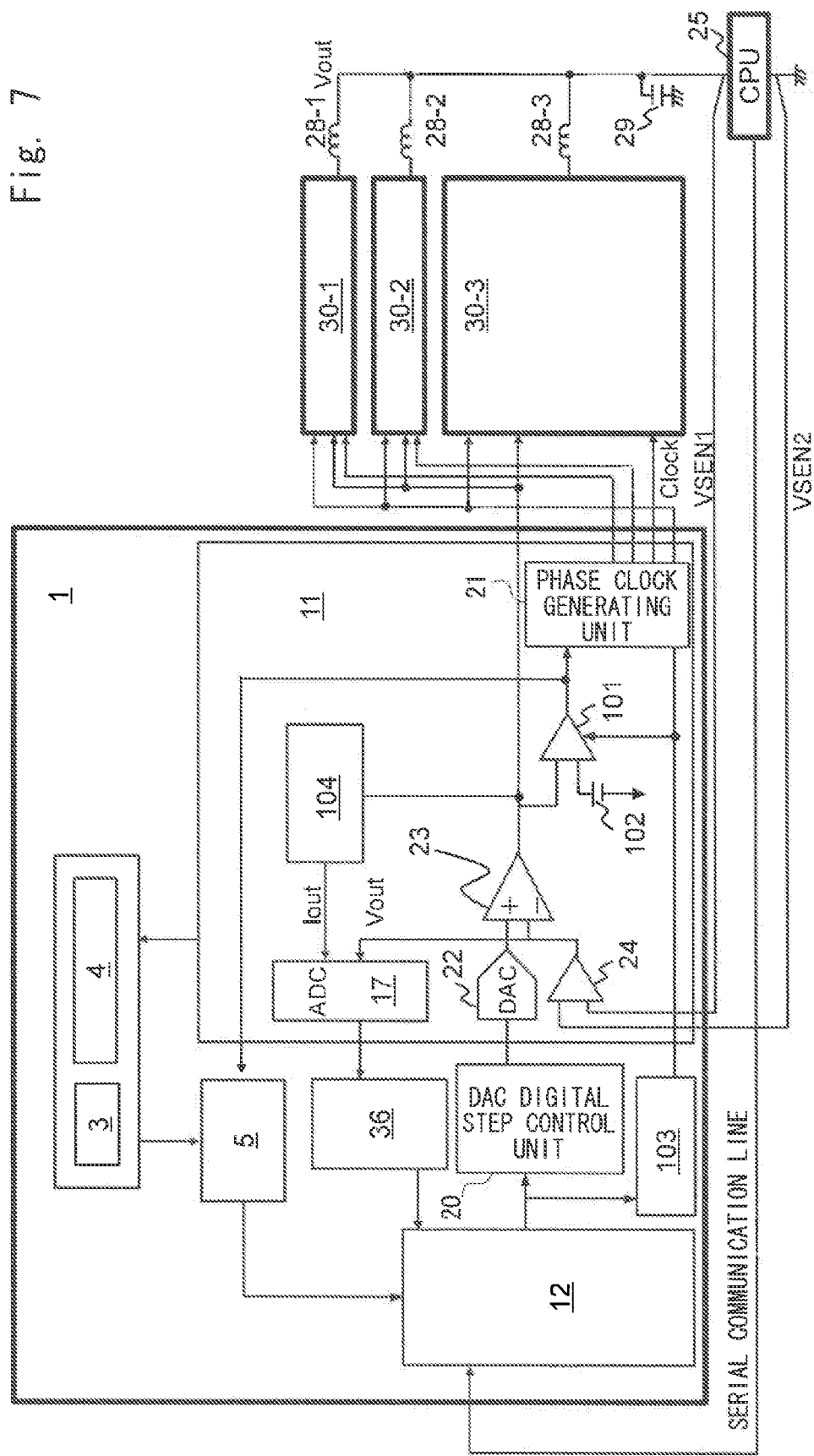
FIG. 7 is a diagram showing a controller and blocks of a system using the controller.

FIG. 7 shows the controller 1 and blocks of the system using the controller 1 according to this exemplary embodiment. The controller 1 shown in FIG. 7 has the configuration of the controller 1 shown in FIG. 1 with modifications in a part of the controller 1 shown in FIG. 7. In FIG. 7, the parts denoted by the same reference numerals as in FIG. 1 are the same parts, thus the detailed explanation of such parts shall not be provided here. Differences from FIG. 1 are explained below.

In FIG. 7, 103 is a mode control circuit and is supplied with a command from the CPU 25 via the SVID command evaluating circuit 12. In FIG. 7, 101 is a detection comparing circuit (detection circuit). An operation of the detection comparing circuit 101 is controlled by the mode control circuit 103. An operation of the phase clock generating unit 21 is also controlled by the mode control circuit 103 in the exemplary embodiment shown in FIG. 7. When the mode control circuit 103 controls the detection comparing circuit 101 to be in an operating state, the detection comparing circuit 101 compares the output voltage of the error amplifier 23 with a predetermined voltage 102 and supplies a comparison result to the phase clock generating unit 21 and the MCU 5. Note that an instruction from the CPU 25 to the mode control circuit 103 is supplied through a serial communication line.

Further, 104 is a current sense circuit that converts the output voltage of the error amplifier 23 into a current. The current sense circuit 104 converts the output voltage of the error amplifier 23 into a current while the PWM unit 151 (FIG. 1) is driving the high-side MOSFET 196 (FIG. 1) and the low-side MOSFET 197 (FIG. 1). Accordingly, a current corresponding to a driving current when the DC-DC converter 33 (FIG. 1) is operating by the PWM signal is supplied to the DSP 36 via the ADC 17. The DSP 36 performs a predetermined operation on digital data corresponding to the current according to the supplied driving current and writes a result of the operation in the register (e.g., the above-mentioned telemetry register 15) inside the command evaluating circuit 12. The MCU 5 evaluates the value written in the register and changes the value of the register (e.g., the above-mentioned parameter register 8). The DAC digital step control unit 20 controls the DAC 22 according to the values of the registers.

Figure 8:
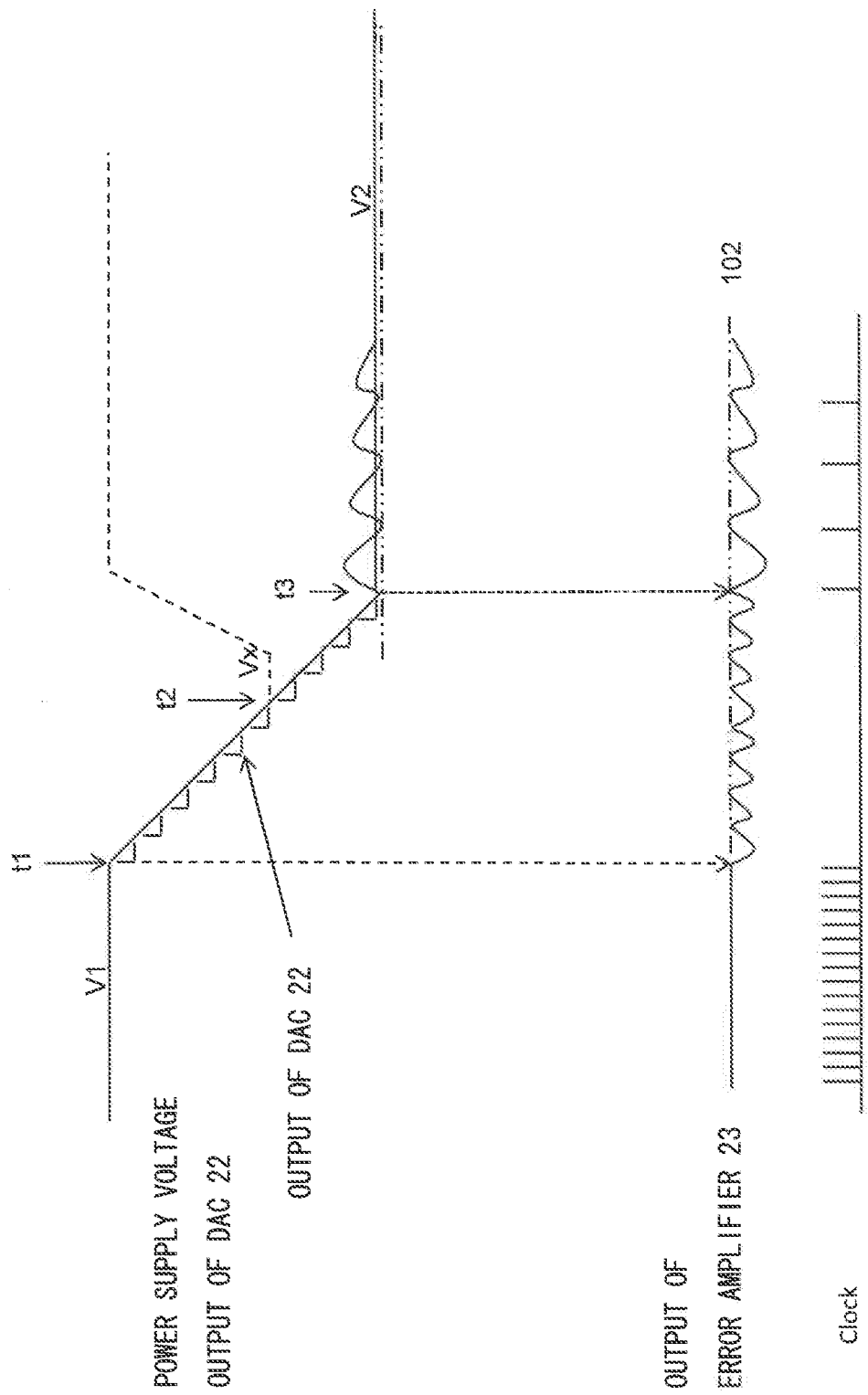
FIG. 8 is waveform charts for explaining an operation of the blocks shown in FIG. 7.

Next, the above-mentioned operation of transitioning from the normal mode to the discharge mode is explained using FIG. 8. FIG. 8 shows waveforms of the output voltage (target voltage) of the DAC 22, the power supply voltage supplied to the CPU 25, the output voltage of the error amplifier 23, and the clock signal supplied to the voltage regulator 30-1. In FIG. 8, the horizontal axis represents time and the vertical axis represents a voltage.

When the above normal mode using the PWM signal is specified to the operation mode register by the CPU 25 through a serial communication line, the DAC 22 outputs a target voltage corresponding to a desired power supply voltage (i.e., a voltage V1 in FIG. 8 upper part). At this time, the power supply voltage of the CPU 25 is detected by the sense amplifier 24 and is supplied to the error amplifier 23 as a measurement voltage. The error amplifier 23 detects a difference between the target voltage from the DAC 22 and the measurement voltage and supplies the difference to the voltage regulators 30-1 to 30-3. Moreover, at this time, the phase clock generating unit 21 generates a periodic signal Clock, as shown in FIG. 8 lower part, and supplies the clock signal Clock to the PWM unit 151 shown in FIG. 1. The periodic clock signal Clock and the output of the error amplifier 23 generate the PWM signal which drives the high-side MOSFET 196 and the low-side MOSFET 197. In this way, as shown in FIG. 8, feedback control is performed so that the power supply voltage will be the desired voltage V1.

Next, at time t1, when the discharge mode is specified by the CPU 25 to the operation mode register through the serial communication line, the mode control circuit 103 controls the phase clock generating unit 21 to stop generating the clock signal Clock. Further, the mode control circuit 103 controls the detection comparing circuit 101 to be in an operating state. A value of the above-mentioned output voltage of the error amplifier 23 is determined by a load current. The voltage increases or decreases according to a difference (an amount of error) between the measurement voltage and the target voltage above or below the voltage determined by the load current as a central voltage. Therefore, when the target voltage is largely changed (reduced), the amount of error will be large, and even when the power supply voltage reaches the desired value at time t3, the power supply voltage further falls due to a response error in the error amplifier 23. This is explained later in detail.

On the other hand, when the discharge mode is specified to the operation mode register, the MCU 5 instructs the DAC digital step control unit 20 to change digital data at a predetermined step, in which the digital data is an output of the DAC digital step control unit 20 and supplied to the DAC 22 so as to reduce the target voltage. Then, the target voltage output from the DAC 22 is reduced stepwise, as indicated by the two-dot chain line in FIG. 8 upper part. Therefore, the value of the output voltage of the error amplifier 23 will stay near the above-mentioned central voltage, thereby reducing the delay in feedback caused by the delay in the error amplifier.

At time t1, when the target voltage output from the DAC 22 is reduced, the output voltage (the measurement voltage) of the sense amplifier 24 will be lower than the target voltage (a third target voltage) at the time of reduction. Thus, the output voltage of the error amplifier 23 will be lower than the central voltage (i.e., the predetermined voltage 102). As described above, in the discharge mode, the high-side MOSFET 196 and the low-side MOSFET 197 do not supply power. Accordingly, the power supply voltage supplied to the CPU 25 gradually falls because charges stored to the capacitor 29 and the like are discharged. When the power supply voltage falls by the discharge, a difference in the voltages supplied to the error amplifier 23 will be smaller, and the output voltage of the error amplifier 23 increases toward the predetermined voltage 102. When the output voltage from the error amplifier 23 reaches the predetermined voltage 102, an output of the detection comparing circuit 101 is inverted, indicating a match between the output voltage from the amplifier 23 and the predetermined voltage 102, and the detection comparing circuit 101 notifies the MCU 5 of the match.

In response to the notification of the match from the detection comparing circuit 101, the MCU 5 instructs the DAC digital step control unit 20 via the command evaluating circuit 12 to change the digital data supplied to the DAC 22. With this instruction, the DAC digital step control unit 20 outputs digital data that reduces the target voltage output from the DAC 22 by one step. In response to the digital data, the DAC 22 reduces the target voltage by one step as indicated by the two-dot chain line in FIG. 8 upper part. The error amplifier 23 compares the target voltage (a fourth target voltage), which is reduced by one step, with the measurement voltage output from the sense amplifier 24. In a similar manner as above, the output voltage of the error amplifier 23 once falls below the predetermined voltage 102 and then increases to reach the predetermined voltage 102. The above operation is repeated thereafter.

In the discharge mode, when the power supply voltage that should be supplied to the CPU 25 reaches a desired power supply voltage V2 (at time t3 in FIG. 8 upper part), the MCU 5 instructs the mode control circuit 103 to perform PFM (Pulse Frequency Modulation) control. In response to the instruction for the PFM control, the mode control circuit 103 controls the phase clock generating unit 21 to generate a clock signal Clock having a phase according to the output from the detection comparing circuit 101. Then, the high-side MOSFETs and the low-side MOSFETs inside the voltage regulators 30-1 to 30-3 are controlled to turn on and off according to the difference between the target voltage (the target voltage corresponding to the desired power supply voltage V2) and the measurement voltage. In the PFM control, the frequency to turn on, for example, the high-side MOSFET is changed, unlike the PWM control where a pulse width (a pulse width on a time axis) to turn on the high-side MOSFET is changed, for example. That is, frequency of the clock signal Clock that is output from the phase clock generating unit 21 changes according to the difference between the target voltage and the measurement voltage, so that the power supply voltage will be the desired power supply voltage V2. As described so far, the PFM control achieves reduction in the power consumption of the voltage regulators when the power supply voltage supplied to the CPU 25 is reduced (to V2).

In the case of transitioning to the PWM control, the voltage supplied from the error amplifier 23 to the detection comparing circuit 101 has a relatively close value to the predetermined voltage 102, which is supplied as a reference voltage, instead of a relatively distant value from the predetermined voltage 102. This makes it possible to prevent, at the time of transitioning to the PFM control, a relatively large change in the output voltages of the voltage regulators, thereby shortening the time for the power supply voltage to converge to the desired voltage value.

In the discharge mode, values of digital data corresponding to the target voltage output from the DAC 22 are held in the registers of the command evaluating circuit 12. It is thus possible to evaluate whether or not the power supply voltage has reached the desired power supply voltage V2 by evaluation of the values using the MCU 5.

When the CPU 25 issues, for example, an instruction for changing the value of the power supply value (to a voltage Vx in FIG. 8 upper part) is supplied (at the time t2 in FIG. 8 upper part) in the discharge mode, the SVID command evaluating circuit 12 instructs the DAC digital step control unit 20 to change the digital data to output. Also in this case, the digital data corresponding to the target voltage at the time t2 is output from the DAC digital step control unit 20, thereby obtaining the difference from the digital data at the time of receiving the instruction for change. That is, it is possible to obtain an original voltage value at the time of receiving the instruction for increase and a voltage value to increase, and the voltage value can be increased from the time t2 as indicated by the chain line in FIG. 8 upper part. In order to increase the voltage, the PWM control may be performed such that the mode control circuit 103 controls the phase clock generating unit 21 to generate periodic clock signals. Alternatively, the PFM control may be performed such that the mode control circuit 103 controls the phase clock generating unit 21 to generate a clock signal having frequency according to the target voltage and the measurement voltage.

The voltage value to be reduced in the above steps may be a fixed value or may be determined according to a current value from the current sense circuit 104 before the power supply voltage is reduced, for example, before transitioning to the discharge mode. When the voltage value to be reduced is determined according to the current value from the current sense circuit 104, the MCU 5 generates digital data corresponding to the voltage value to be reduced in one step according to the output of the current sense circuit 104, which is supplied to the DSP 36 via the ADC 17, and stores the digital data to the DAC digital step control unit 20 via the command evaluating circuit 12. The DAC digital step control unit 20 supplies the DAC 22 with the digital data reduced stepwise according to the digital data held therein and generates the target voltage. Moreover, the voltage value to be reduced may differ in each step. For example, in the discharge mode, the voltage to be reduced may differ in each step according to a reduction speed of the power supply voltage by a load (e.g., the CPU 25) fluctuation. To that end, the output from the detection comparing circuit 101 is supplied to the MCU 5 as an interrupt signal, and when the interrupt signal is supplied at a shorter period than a predetermined time, the digital data stored to the DAC digital step control unit 20 may be incremented to increase a value of the target voltage reduced in one step. Thus, reduction to the desired power supply voltage V2 can be detected in a shorter time.

As can be seen from FIG. 8, the above-mentioned third target voltage is a voltage between the first target voltage, which corresponds to the voltage V1 before reducing the power supply voltage, and the second target voltage, which corresponds to the reduced voltage V2. The above-mentioned fourth target voltage is a voltage between the third target voltage and the second target voltage. As described above, the DAC 22 generates the voltage according to the digital data from the DAC digital step control unit 20. Thus, the DAC 22 can be regarded as a voltage generating circuit. The detection comparing circuit 101 detects that the difference voltage between the target voltage and the measurement voltage becomes almost 0V, i.e., whether or not the output voltage of the error amplifier 23 has reached the predetermined voltage 102, by comparison with the predetermined voltage 102. Therefore, the detection comparing circuit 101 can be regarded as a detection circuit. Further, the ADC 17 that generates the digital data to be supplied to the DAC 22 according to the output of the error amplifier 23, the SVID command evaluating circuit 12, the DSP 36, the DAC digital step control unit 20, and the MCU 5 can be regarded to constitute a digital control unit.

With regard to the voltage regulators, for example, the three voltage regulators may be activated until the time t1, and the voltage may be supplied by the PWM control. At and after the time t3, only one voltage regulator (e.g., 30-1) may be activated, and the voltage may be supplied by the PFM control.

Figure 9:
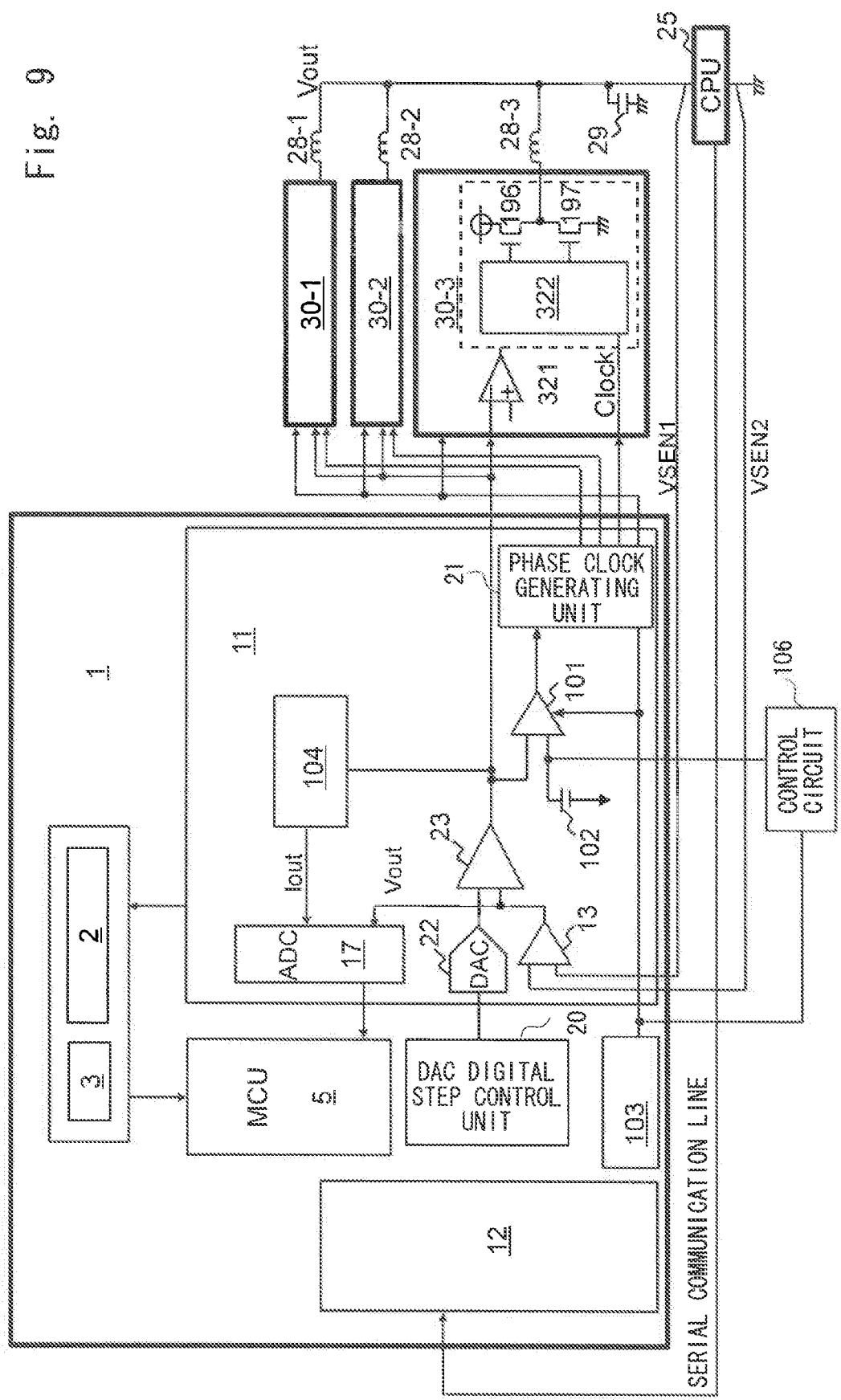
FIG. 9 is a diagram showing a controller and blocks of a system using the controller according to an exemplary embodiment.

FIG. 9 shows an exemplary embodiment with a modification in a part of the controller 1 shown in FIG. 7. In FIG. 9, the parts denoted by the same reference numerals as in FIG. 7 have the same function, and the explanation of such parts is not provided here. Different parts from the exemplary embodiment shown in FIG. 7 are explained below. For the purpose of simplified illustration in the drawings, the configuration of the controller shown in FIG. 7 that are not necessary for explanation of this exemplary embodiment is not shown in FIG. 9.

In order to reduce the power consumption, the power supply voltage supplied to the CPU 25 may be rapidly changed according to the operating state of the CPU 25. Such a case may be, for example, the CPU 25 processes a high load in a short time to have a relatively long low-loaded state (i.e., so-called power-boost). In such a case, it is desirable that the clock signal for driving the voltage regulators 30-1 to 30-3 is made relatively high, and the capacitor 29 is made relatively small. However, when frequency of the clock signal is increased and the capacitor is made small, the waveform of the output voltage of the voltage regulator largely changes due to a change or fluctuation in the operating state of the CPU 25.

When the CPU 25 changes from a high-load state to a low-load state, for example as shown in FIG. 8, the power supply voltage is changed from the voltage V1 to V2 by the controller 1 and the voltage regulators 30-1 to 30-3. In this case, the controller 1 drives the voltage regulators by the PFM control in order to supply the voltage V1 or drives the voltage regulators by the PFM control in order to supply the voltage V2. Power efficiency can be improved by using two types of control, which are the PWM control and the PFM control.

An example of transition between the PWM control and the PFM control is explained using FIGS. 7 and 8. The transition between the PWM control and the PFM control is performed by supplying a command to the SVID command evaluating circuit 12 via a serial communication line shown in FIG. 9. The MCU 5 controls the mode control circuit 103 according to the command supplied via the SVID command evaluating circuit 12. In response to an instruction for the PFM control, the mode control circuit 103 controls the detection comparing circuit 101 to operate. FIG. 9 shows an example of controlling the mode control circuit 103 by the MCU 5. However in a similar manner as FIG. 7, the SVID command evaluating circuit 12 may control the mode control circuit 103.

Then, in the PWM control, the detection comparing circuit 101 detects that the output voltage of the error amplifier 23 has reached the predetermined voltage 102 and notifies the phase clock generating unit 21 that the output voltage of the error amplifier 23 has reached the predetermined voltage 102. The phase clock generating unit 21 generates the clock signal Clock upon receiving the notification and supplies the clock signal Clock to the voltage regulators 30-1 to 30-3. The voltage regulators turns on the high-side MOSFETs or the low-side MOSFETs according to the timing of the clock signal Clock for a fixed time. The timing when the output voltage of the error amplifier 23 reaches the predetermined voltage changes according to the difference between the target voltage and the measurement voltage. Therefore, the frequency to turn on the high-side MOSFETs or the low-side MOSFETs changes according to the difference between the target voltage and the measurement voltage. That is, current fluctuation supplied to the CPU 25 is compensated by the frequency to turn on and off the high-side MOSFETs and low-side MOSFETs. In a low-load state, the current supplied to the CPU 25 is reduced. Thus, the power consumption of the controller 1 and the voltage regulators can be reduced by suppressing the frequency. Power supply by the PFM control may be referred to as a PS2 mode hereinafter.

On the other hand, in the PWM control, a level of the output voltage of the error amplifier 23 is detected by a PWM comparator 321, and a pulse generating circuit 322 operates according to a detection result. Further, the pulse generating circuit 322 generates PWM waveforms for driving the high-side MOSFET and the low-side MOSFET. As described above, in the PWM control, the time to turn on and off the high-side MOSFETs and the low-side MOSFETs changes according to the current supplied to the CPU 25 (cycle is constant). Note that in FIG. 9, assume that the PWM comparator 321 corresponds to the PWM comparator 31 shown in FIG. 1 and the pulse generating circuit 322 includes the latch circuit 32 and the MOS control unit 198 shown in FIG. 1. In order to distinguish from the above-mentioned PS2 mode, the power supply by the PWM control may be referred to as a PS1 mode hereinafter.

In the PS2 mode, the detection comparing circuit 101 is used. However when the predetermined voltage 102, which is the reference voltage for the comparison, is set to high, it takes time for the output voltage of the error amplifier 23 to reach the reference voltage, thereby reducing the frequency to turn on and off the high-side MOSFETs and the low-side MOSFETs. Consequently, this enables reduction in the power consumption of the controller and the voltage regulators. However, this also increases ripple in the power supply voltage, increases peak current, and increases conduction loss of the high-side MOSFETs. On the other hand, when the predetermined voltage 102, which is the reference voltage, is set to low, the frequency to turn on and off the high-side MOSFETs and the low-side MOSFETs increases. Therefore, in this case, loss in the voltage regulators increases.

The value of the predetermined voltage 102, which is the reference voltage, is set in consideration of the above-mentioned increase in ripple, an increase in peak current, conduction loss, and loss. The transition from the PS1 mode to the PS2 mode may occur, for example, when the ability of current supply in the PS1 mode deteriorates. When the ability of the current supply deteriorates in the PS1 mode, the value of the output voltage of the error amplifier 23 is reduced to reduce the on-time of the high-side MOSFETs. The reference voltage in the PS2 mode is determined in consideration of the above-mentioned points (the increase in the ripple, the conduction increase in the voltage regulators and the like). Therefore, at the time of transitioning from the PS1 mode to the PS2 mode, a relatively large potential difference arises between the reference voltage supplied to the detection comparing circuit 101 and the output voltage of the error amplifier 23. For example, there may be a state in which the output of the error amplifier 23 becomes lower than the reference voltage at the time of such transition. When such a state arises, immediately after the transition, the detection comparing circuit 101 will not detect the match, and the phase clock generating unit 21 does not generate the clock signal Clock. Thus, the voltage regulators 30-1 to 30-3 do not operate, and the power supply voltage of the CPU 25 temporarily falls. As described above, when the capacitor 29 is made small for reducing the power consumption, the power supply voltage could largely fail at the time of changing the mode, and the power supply voltage droops below the minimum operating voltage of the CPU 25.

In the exemplary embodiment shown in FIG. 9, the circuit control 106 is connected to an input node of the detection comparing circuit 101 that is supplied with the predetermined voltage 102 which is the reference voltage. The control circuit 106 is controlled by a signal from the mode control circuit 103. At the time of transitioning from the PWM control to the PFM control (e.g., at the time of transitioning from the PS1 mode to the PS2 mode), the mode control circuit 103 generates an instruction to the control circuit 106 to change an output thereof. In response to this instruction, the control circuit 106 temporarily changes the reference voltage (e.g., reduces the reference voltage). This is explained later using FIG. 10. Then, the predetermined voltage 102, which is the reference voltage, can be reduced at the time of transitioning from the PS1 mode to the PS2 mode. It is thus possible to reduce the voltage difference (the voltage difference between the output voltage of the error amplifier 23 and the reference voltage that is changed by the control circuit 106) applied between a pair of input nodes of the detection comparing circuit 101. Therefore, at the time of transitioning to the PWM control, it is possible to reduce a delay in generating the clock signal Clock by the phase clock generating unit 21, thereby preventing large fall in the power supply voltage.

Figure 10:
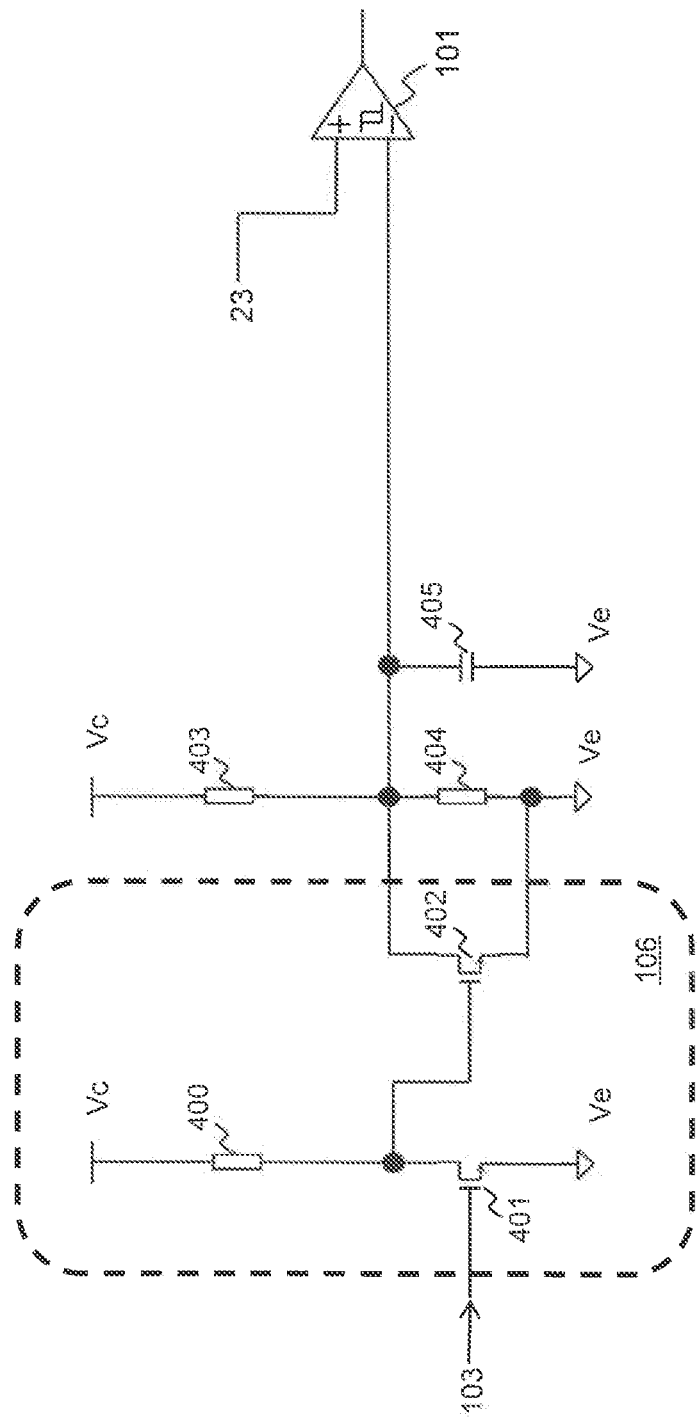
FIG. 10 is a circuit diagram showing a configuration of a controller circuit shown in FIG. 9.

FIG. 10 is a circuit diagram of the control circuit 106. In FIG. 10, 400, 403, and 404 are resistive elements, 401 and 402 are MOSFETs, and 405 is a capacitive element. The resistive elements 403 and 404 are connected in series between power supply Vc and a ground voltage Ve of the circuit. Thus, the power supply voltage Vc is divided by the resistive elements 403 and 404, generating the predetermined voltage 102 which is the reference voltage. The capacitive element 405 connected in parallel to the resistive element 404 is provided to stabilize the reference voltage. The generated reference voltage is supplied to an input node of the detection comparing circuit 101 in FIG. 9. The resistive element 400 and the MOSFET 401 are inverter connected, and an output from the resistive element 400 and the MOSFET 401 is supplied to the gate of the MOSFET 402. The MOSFET 402 is connected in parallel to the resistive element 404, functioning as a switching element. A signal from the mode control circuit 103 is supplied to the gate of the MOSFET 401.

At the time of transitioning from the PWM control to the PWM control, the mode control circuit 103 supplies a control signal that changes from high-level to low-level, and after a predetermined time, returns from low-level to high-level. Thus, at the time of transitioning from the PWM control to the PFM control, the MOSFET 402 is turned on only for the above-mentioned predetermined time, thereby reducing the reference voltage.

The correspondence between FIGS. 9 and 10 is explained here. The control circuit 106 is composed of the resistive element 400 and the MOSFETs 401 and 402. Further, the predetermined voltage 102 is generated by the resistive elements 403 and 404 and the capacitive element 405.

Figure 11:
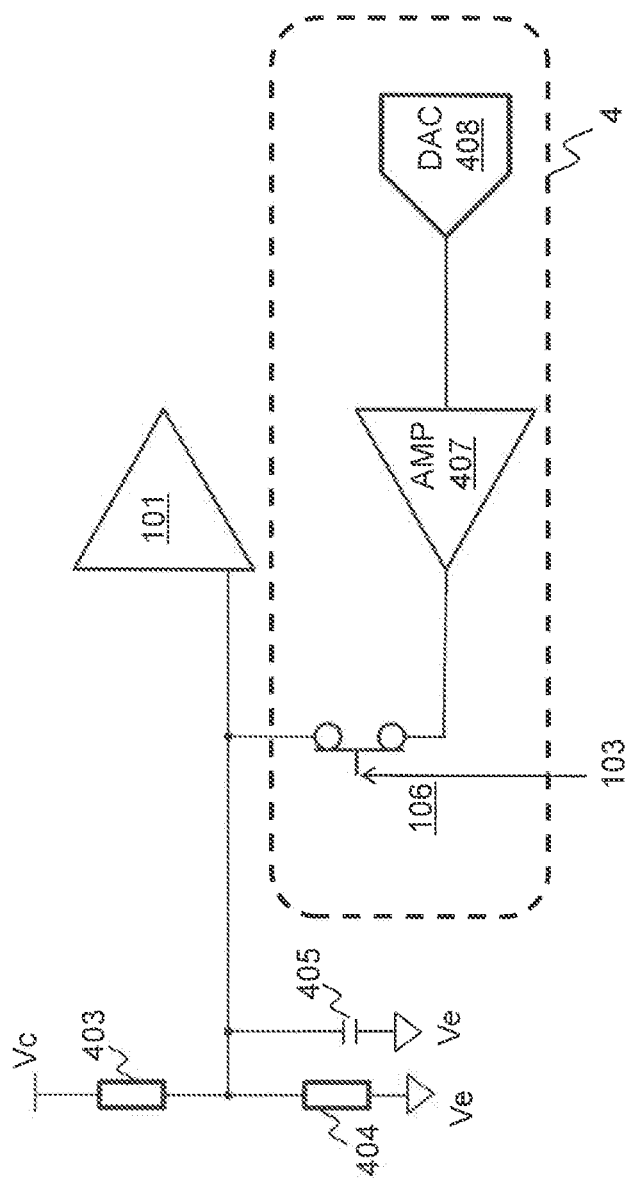
FIG. 11 is a block diagram showing a modified example of a control circuit.

FIG. 11 shows a modified example of the control circuit 106. In FIG. 11, the same parts are denoted by the same reference numerals as in FIG. 10, and the explanation of such parts is not provided here. In FIG. 11, the control circuit 106 includes a switch 406, an amplifier 407, and a DAC 408. The switch 406 is controlled to turn on and off by a control signal from the mode control circuit 103. Under the PWM control (e.g., in the PS1 mode), the mode control circuit 103 controls the switch 406 to turn on. Then, an analog voltage from the DAC 408 is amplified by the amplifier 407 and supplied to the input node of the detection comparing circuit 101. At this time, the reference voltage generated by the resistive element 403 and the capacitive element 405 is also supplied to the input node of the detection comparing circuit 101. However, a voltage of the input node of the detection comparing circuit 101 is clamped to a value of the output voltage of the amplifier 407. At the time of transitioning from the PWM control to the PFM control, the switch 406 is turned off by a control signal from the mode control circuit 103. Then, the voltage of the input node of the detection comparing circuit 101 changes from the clamped voltage to the reference voltage (a divided voltage by the resistive elements 403 and 404). Hence, at the time of transitioning from the PWM control to the PFM control, the clamped voltage lower than the reference voltage is applied to the input node of the detection comparing circuit 101, and the voltage of the input node changes toward the reference voltage over time. In this modified example, the clamped voltage can be changed by an amplification rate of the amplifier 407 and the digital data supplied to the DAC 408. Note that the digital data supplied to the DAC 408 may be changed by the MCU 5 or may be a fixed value.

Other exemplary embodiment incorporates the exemplary embodiment shown in FIG. 9 into the exemplary embodiment shown in FIG. 7. In this exemplary embodiment, an output of the control circuit 106 shown in FIG. 9 is connected to the input node of the detection comparing circuit 101 shown in FIG. 7. That is, the output of the control circuit 106 is connected to a connection node of the detection comparing circuit 101 (FIG. 7) and the predetermined voltage 102 (FIG. 7). Moreover, an input of the control circuit 106 is connected to the mode control circuit 103 (FIG. 7). Also in this case, when the mode is changed from the PS2 mode, where the power supply voltage is generated by the PWM control, to the PS1 mode, where the power supply voltage is generated by the PFM control, the predetermined voltage 102 (FIG. 7) temporarily falls by the control circuit 106.

FIG. 12 shows an exemplary embodiment with a modification in a part of the controller 1 shown in FIG. 1. Differences of this exemplary embodiment from the controller 1 shown in FIG. 1 are in the error amplifier 23, the DAC 22, and the differential amplifier 24. In FIG. 12, the controller 1 is indicated by the broken line. The parts of the controller 1 not shown in FIG. 12 have the same configuration as the controller 1 in FIG. 1. Thus the detailed explanation for those parts is not provided here.

In FIG. 12, T1, T2, FB, E1, and E0 are external terminals of the controller 1. The power supply voltages VSEN1 and VSEN2 of the CPU 25 are supplied to the external terminals T1 and T2 respectively, and the external terminal E0 is connected to an inverting input terminal of the PWM comparator 31 shown in FIG. 1. A loop filter is connected between the external terminals E1 and E0. The loop filter is composed of a resistive element 426 and the capacitive elements 427 and 428. Moreover, a load resistive element 425 is connected between the external terminals FB and E1. The load resistance element 425 is connected between the output of the differential amplifier 24 and the inverting input terminal of the error amplifier 23.

An output of the differential amplifier 24 is fed back to an inverting input terminal (−) of the differential amplifier via a feedback resistive element 424. Further, the power supply voltage VSEN2 of the CPU 25 is also supplied to the inverting input terminal (−) of the differential amplifier 24 via a resistive element 423. This detail is not shown in FIG. 1. Moreover, the power supply voltage Vc is supplied to a non-inverting input terminal (+) of the differential amplifier 24 via a resistive element 421 for bias. Further, the power supply voltage VSEN1 of the CPU 25 is supplied to the non-inverting input terminal (+) of the differential amplifier 24 via a resistive element 422. As well known in the art, the amplification rate of the differential amplifier 24 is determined by values of these resistive elements 421 to 424. The output of the differential amplifier 24 is supplied to the inverting input terminal (−) of the error amplifier 23 via the load resistance element 425. An output of the DAC 22, which generates the target voltage, is supplied to the non-inverting input terminal (+) of the error amplifier 23. The DAC 22 generates the target voltage according to the digital data from the DAC digital step control unit 20 (FIG. 1).

In FIG. 12, the one-dot chain line indicates a current DAC. The current DAC starts operating according to a signal from the DAC digital step control unit 20 and generates a current according to the digital data from the DAC digital step control unit 20. The output of the current DAC is connected to the inverting input terminal (−) of the error amplifier 23. A sink current according to the digital data is supplied to the differential amplifier 24 via the load resistance element 425. The current DAC 420 includes MOSFETs 429 to 432. The sources of the MOSFETs 429 to 432 are connected to a ground voltage of the circuit, and the gates of the MOSFETs 429 to 432 are connected in common. The gate of the MOSFET 429 is further connected to the drain of the MOSFET 429. A constant current circuit 436 is provided between the drain of the MOSFET 429 and the power supply voltage Vc. Switching circuits 433 to 435 are respectively connected between the drains of the MOSFET 430 to 432 and the output of the current DAC 420. The switching circuits 433 to 435 are turned on and off according to the digital data from the DAC digital step control unit 20. The MOSFETs 429 to 432 constitute a current mirror circuit. When size ratios of the MOSFETs 430 to 432 to the MOSFET 429 are set, a current of the constant current circuit 436 and a current according the size ratios are output (drawn) from the current DAC 420 by turning on and off the switching circuits 433 to 435. That is, the sink current having a value according to the digital data from the DAC digital step control unit 20 is supplied to the load resistance element 425.

Figure 13:
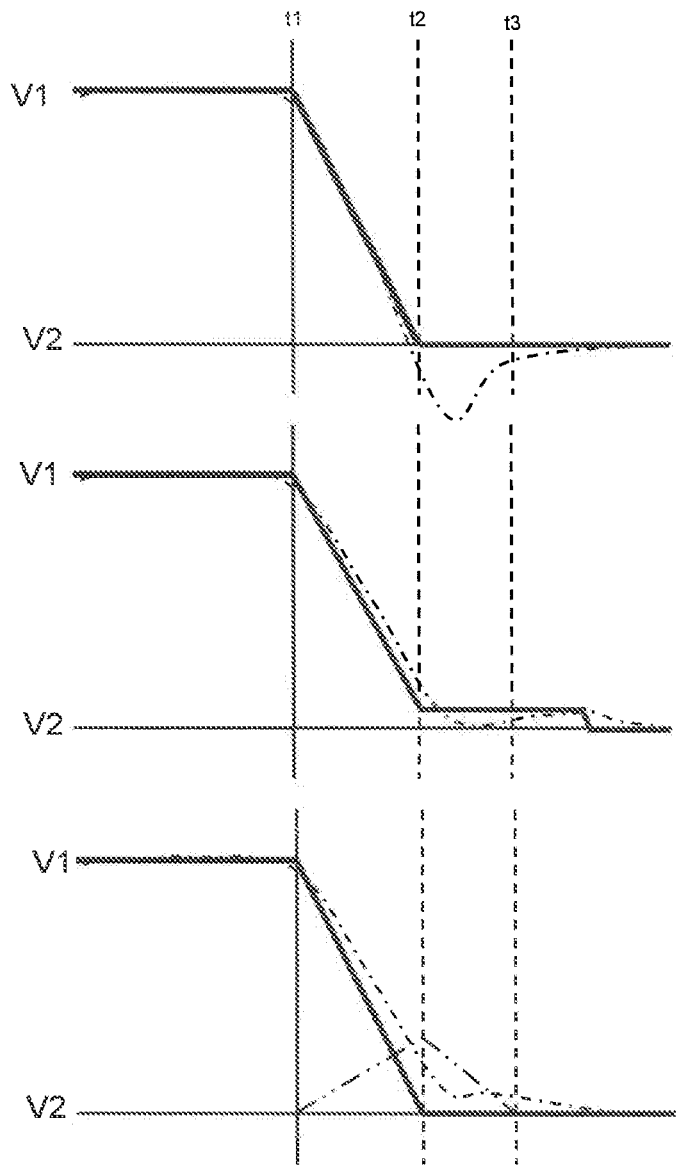
FIG. 13 is waveform charts for explaining an operation of FIG. 12.

FIG. 13 shows waveforms of the output voltage of the DAC 22 and the power supply voltage supplied to the CPU 25. In FIG. 13, the horizontal axis represents time and the vertical axis represents a voltage. In FIG. 13, the solid line indicates the waveform of the output voltage of the DAC 22, and the one-dot chain line indicates the waveform of the power supply voltage supplied to the CPU 25. The two-dot chain line shown in FIG. 13 lower part indicates the output voltage of the error amplifier 23.

FIG. 13 upper part shows a waveform when the current DAC 420 is not provided. FIG. 13 shows an example in which the target voltage have the same value as the power supply voltage. The target voltage may have a different voltage value from the power supply voltage. For example, when the measurement voltage is generated by dividing the power supply voltage, the voltage values of the measurement value and the target voltage are different from the power supply voltage. Here, for ease of explanation, the case is explained in which the target voltage and the power supply voltage are the same value.

When the CPU 25 supplies a command to the controller 1 for reducing the power supply voltage from the voltage V1 to V2, the voltage indication register 18 is changed in response to this command. This change is notified to the DAC digital step control unit 20, and the DAC digital step control unit 20 issues, to the DAC 22 at time t1, an instruction to change the target voltage to the value stored to the voltage indication register 18. Then, the DAC 22 outputs, at the time t1, the target voltage which is reduced from the voltage V1 to V2. At time t2, the target voltage output from the DAC 22 reaches the indication voltage V2. However, as indicated by the one-dot chain line, the power supply voltage oscillates such that the power supply voltage falls below the voltage V2 and then returns to the voltage V2. The oscillation of the power supply voltage converges at and after time t3.

FIG. 13 middle part shows an example of the waveform in which an offset voltage is included in the target voltage output from the DAC 22. That is, a voltage greater than the voltage V2 is output from the DAC 22 as the target voltage until the time t2, and after time t3, the voltage V2 is output as the target voltage. By doing so, as indicated by the one-dot chain line, the power supply voltage falls near the voltage V2 at the time t1 and reaches the voltage V2 after the time t3. It therefore takes time for the power supply voltage to reach the target voltage V2. However it is possible to reduce fall in the waveform of the power supply voltage below the voltage V2.

FIG. 13 lower part is an operational waveform of the circuit shown in FIG. 12. In FIG. 13 lower part, in a similar manner as FIG. 13 upper part, the output voltage (the target voltage) of the DAC 22 changes from V1 to V2 according to the command from the CPU 25. At the time t1, the current DAC 420 enters an operating state. In this exemplary embodiment, the digital data supplied from the DAC digital step control unit 20 to the DAC 420 changes so that a value of the sink current output from the current DAC 420 changes over time.

That is, at the time t1, the digital data is generated to be supplied to the DAC 420 so that the predetermined sink current is supplied from the current DAC 420 to the load resistive element 425 at the time t1, and the sink current increases until the time t2 when the power supply voltage reaches the voltage V2. The offset voltage increases as the sink current increases. When the power supply voltage reaches the voltage V2, the DAC digital step control unit 20 generates the digital data to reduce the sink current and supplies the digital data to the DAC 22, thereby reducing the offset voltage. As described using FIG. 1, the power supply voltage is detected by the ADC 17, and the MCU 5 or the DSP 36 evaluates whether or not the power supply voltage has reached the voltage V2, for example. By changing the digital data output from the DAC digital step control unit 20 at the timing when the MCU 5 or the DSP 36 evaluates that the power supply voltage has reached the voltage V2, the sink current can be increased and then reduced, as described above. This prevents fall in the waveform of the power supply voltage lower than the voltage V2. Moreover, as shown in FIG. 13 middle part, the target voltage of the DAC 22 does need a change before reaching the voltage V2, the time until convergence can be reduced. When the target voltage of the DAC 22 is changed before reaching the voltage V2, there arises a limitation on reducing the width (the voltage value) of the voltage step to change. On the other hand, by the current DAC 420, it is possible to set the width of the voltage step separately from the DAC 22, thus finely controlling the waveform of the power supply voltage. Evaluation of whether the power supply voltage has reached the voltage V2 may be performed in the telemetry processing or using the example shown in FIG. 7.

As can be seen from FIG. 13 lower part, the current DAC 420 corrects the measurement voltage and can be regarded as a correction circuit.

Figure 14:
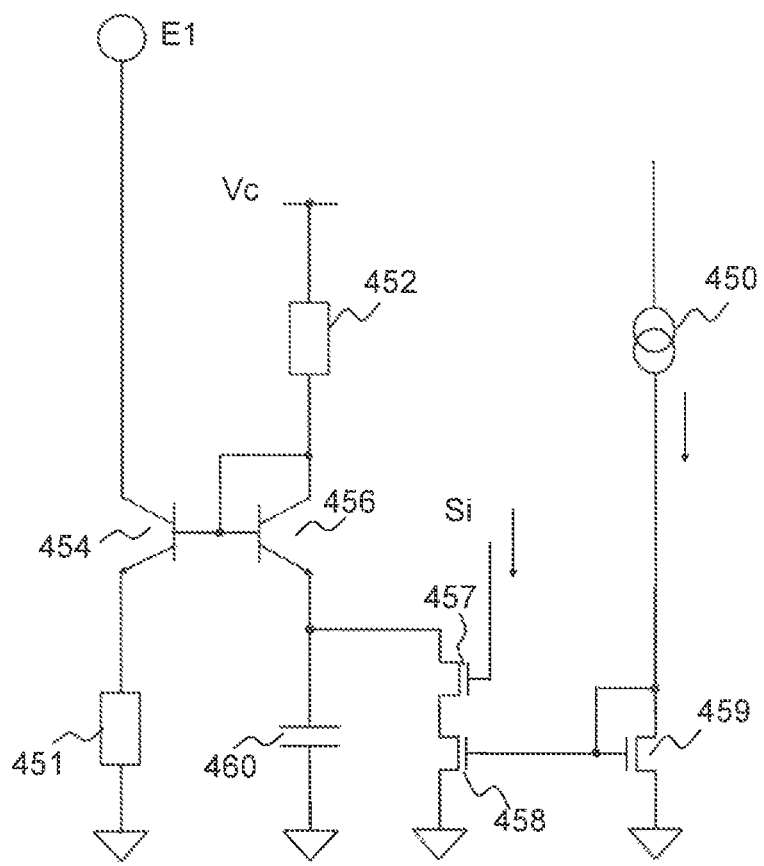
FIG. 14 is a circuit diagram showing a modified example of the exemplary embodiment.

FIG. 14 shows a modified example of the correction circuit. In FIG. 12, the current DAC 420, which is a correction circuit, is provided inside the semiconductor chip. However in FIG. 14, the correction circuit is provided outside the semiconductor chip. It is obvious that when the correction circuit is provided outside the controller 1 as shown in FIG. 14, the current DAC 420 will be unnecessary. The correction circuit shown in FIG. 14 includes a diode-connected MOSFET 459 that receives a current from the constant current circuit 450, a MOSFET 458 that constitutes a current mirror with the MOSFET 459, and a MOSFET 457 that is controlled by an indication signal Si instructing reduction in the power supply voltage. When the instruction to reduce the power supply voltage is supplied to the MOSFET 457, the MOSFET 457 is turned on, and a current according to a current of the constant current circuit 450 is supplied to the emitter of a bipolar transistor 456 by the current mirror. With regard to the bipolar transistor 456, the collector and the base are connected, and the collector is connected to the power supply Vc via a resistive element 452. Moreover, the base of the transistor 456 is connected to the base of a bipolar transistor 454. The emitter of the transistor 454 is connected to the ground voltage via a resistive element 451, and the collector of the transistor 454 is connected to the above-mentioned external terminal E1 (FIG. 12). The transistors 456 and 454 constitute a current mirror. A current according to a current flowing to the transistor 456 flows from the external terminal E1 to the ground voltage of the circuit via the transistor 454. Therefore, when the MOSFET 457 is turned on, a sink current is generated for drawing a current from the load resistive element 425 that is connected to the external terminal E1 (FIG. 12). A capacitor 460 connected between the emitter of the transistor 456 and the ground voltage is provided to determine a potential of the emitter when the MOSFET 457 is turned off.

Figure 15:
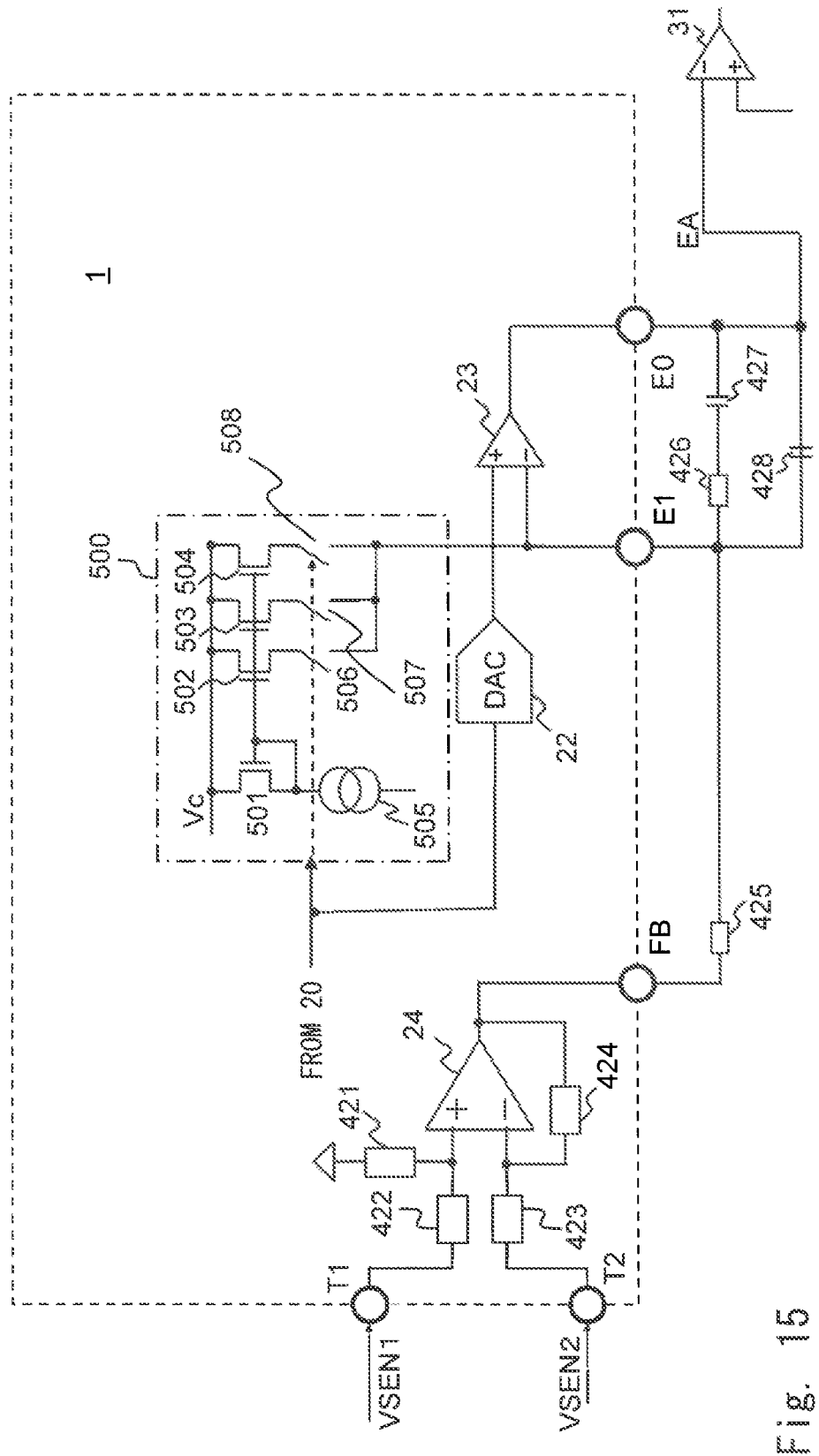
FIG. 15 is a circuit diagram showing a circuit according to the exemplary embodiment.

FIG. 15 shows other exemplary embodiment of the controller 1 shown in FIG. 1. In a similar manner as FIG. 12, FIG. 15 shows the differential amplifier 24, the DAC 22, and the error amplifier 23. Other parts are same as in FIG. 1 and not shown in FIG. 15. Moreover, in FIG. 15, the same parts as in FIG. 12 are denoted by the same reference numerals. No explanation is provided here for the parts with the same reference numerals as in FIG. 12. A difference of the exemplary embodiment shown in FIG. 15 from the exemplary embodiment shown in FIG. 12 is that a current DAC 500 is connected to the inverting input terminal (−) of the error amplifier 23.

The current DAC 500 includes MOSFETs 501 to 504, the sources of which being connected to the power supply Vc, and switching circuits 506 to 508 that are respectively connected between the drains of the MOSFETs 502 to 504 and an output of the current DAC 500. Moreover, the current DAC 500 includes a constant current circuit 505. The switching circuits 506 to 508 are controlled to turn on and off by the digital data from the DAC digital step control unit 20 (FIG. 1). With regard to the MOSFET 501, the drain and the gate are connected, the constant current circuit 505 is connected to the drain. The gates of the MOSFET 501 to 504 are connected in common. The MOSFETs 501 to 504 operate as a current mirror circuit. Therefore, when the switching circuits are turned on by the digital data, a current is generated according to size ratios of the MOSFET 501 to 504, and the current is output from the current DAC 500. Since the current DAC 500 supplies a current to the load resistance element 425, consider that a source current is supplied from the current DAC 500 to the load resistance element 425.

Figure 16:
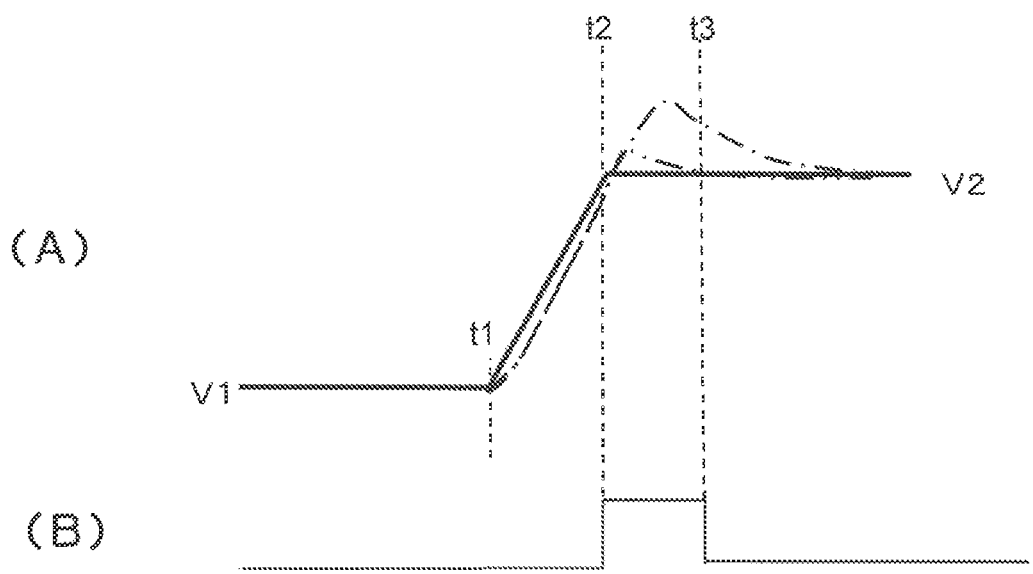
FIG. 16 is a waveform chart for explaining an operation of FIG. 11.

FIGS. 16A and 16B show operational waveforms of FIG. 15. When a command for increasing the power supply voltage from the voltage V1 to V2 is supplied from the CPU 25 to the controller 1, the value of the voltage indication register (FIG. 1) is changed. Thus, at time t1, the DAC digital step control unit 20 outputs digital data for increasing the target voltage to the voltage V2, and the output voltage of the DAC 22, which is the target voltage, increases as indicated by the solid line in FIG. 16A. The power supply voltage of the CPU 25 increases to match the target voltage by the feedback control. At this time, when the current DAC 500 is not provided, the waveform of the power supply voltage changes as indicated by the one-dot chain line in FIG. 16A due to an operation delay included in the error amplifier 23 and the like. That is, the output voltage of the voltage regulator exceeds the voltage V2 due to the operation delay and the like (overshoot). In this exemplary embodiment, when the power supply voltage reaches the voltage V2 (time t2), the current DAC 500 enters the operating state. Then, the source current is supplied to the load resistive element 425, and an offset voltage is included in the measurement voltage. The measurement voltage is applied to the inverting input terminal (−) of the error amplifier 23. Thus, the error amplifier 23 operates to reduce the output voltage of the error amplifier 23 and operates to reduce the power supply voltage exceeding V2 as indicated by the two-dot chain line in FIG. 16A better than the power supply voltage as indicated by the one-dot chain line in FIG. 16A. It is thus possible to reduce the overshoot of the power supply voltage supplied to the CPU 25.

FIG. 16B shows an output waveform of the current DAC 500. The period of current summing from time t2 to time t3 may be set to a register that is provided in the DAC digital step control unit 20 or may be a fixed value. Moreover, the current value applied in this period is determined depending on which of the switching circuits 506 to 508 provided in the current DAC 500 to turn on. The switching circuit to turn on may be fixed or set to a register that is provided in the DAC digital step control unit 20 to enable a change of the switching circuit to turn on. The power supply voltage is converted into a digital signal by the ADC 17. Thus the MCU 5 or the DSP 36 evaluates whether or not the power supply voltage has reached the voltage V2, and an instruction can be made to the current DAC 500 to start operating via the DAC digital step control unit 20. Note that the evaluation of whether or not the power supply voltage has reached the voltage V2 may be performed by the telemetry processing or using the example shown in FIG. 7.

Also in this case, the DAC 500 corrects the measurement voltage in order to reduce overshoot. Thus, the DAC 500 can be regarded as a correction circuit.

As other exemplary embodiment not shown in the drawings, there is the controller 1 including the current DAC 420 shown in FIG. 12 in the exemplary embodiment in FIG. 15. According to this exemplary embodiment, it is possible to reduce fall and overshoot in the power supply voltage waveform.

Although a plurality of exemplary embodiments have been explained using a plurality of drawings, it is obvious that the plurality of exemplary embodiments can be combined.

The embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A controller for controlling a voltage regulator that supplies a power supply voltage supplied to a load, the controller comprising:
    a differential amplifier that outputs a measurement voltage corresponding to the power supply voltage supplied to the load;
    an error amplifier including an non-inverting input terminal and an inverting input terminal that compares a target voltage and the measurement voltage and controls the voltage regulator, the non-inverting input terminal being supplied with the target voltage, and the inverting input terminal being supplied with the measurement voltage; and
    a digital-to-analog conversion circuit that applies an offset voltage to the inverting input terminal in response to a change in a voltage value of the power supply voltage supplied to the load,
    wherein the offset voltage is changed according to digital data supplied to the digital-to-analog conversion circuit.

2. The controller according to claim 1, wherein the digital-to-analog conversion circuit is a current digital-to-analog conversion circuit that converts the digital data into an analog current, and the converted analog current is supplied to a resistive element that is connected between the inverting input terminal of the error amplifier and the differential amplifier.

3. The controller according to claim 2, wherein when the power supply voltage is increased, the current digital-to-analog conversion circuit supplies a current to the resistive element.

4. The controller according to claim 2, wherein when the power supply voltage is reduced, the current digital-to-analog conversion circuit draws a current from the resistive element.

5. A controller for controlling a voltage regulator that supplies a power supply voltage to a load, the controller comprising:
    a microcontroller unit that analyzes and executes a command according to a program;
    a digital signal processing unit that, upon activation, performs signal processing on digital data corresponding to a value of the power supply voltage and transitions to a standby state after the signal processing;
    a control circuit that activates the digital signal processing unit at a predetermined time interval; and
    a voltage indication register that holds data for determining the value of the power supply voltage,
    wherein the microcontroller unit interprets a predetermined command to set data to the voltage indication register and performs control so that the power supply voltage according to the data held in the voltage indication register is supplied from the voltage regulator to the load.

6. The controller according to claim 5, wherein the controller further includes a telemetry register that holds data obtained from the signal processing by the digital signal processing unit.

7. The controller according to claim 6, wherein the controller further includes an analog-to-digital conversion circuit that converts the value of the power supply voltage into digital data, and the analog-to-digital conversion circuit is activated by the control circuit at a predetermined time interval.

8. The controller according to claim 7, wherein the microcontroller unit, in response to an analysis result of the predetermined command, outputs the data held in the telemetry register to an issuer of the command.

9. The controller according to claim 8, wherein the controller is formed on one semiconductor chip.

10. A system comprising:
    a CPU that operates according to a program;
    a voltage regulator that generates a power supply voltage supplied to the CPU; and
    a controller that controls the voltage regulator, wherein the controller comprises:
        a differential amplifier that outputs a measurement voltage according to the power supply voltage supplied to a load;
        an error amplifier including an non-inverting input terminal and an inverting input terminal that compares a target voltage and the measurement voltage and controls the voltage regulator, the non-inverting input terminal being supplied with the target voltage, and the inverting input terminal being supplied with the measurement voltage; and
        a digital-to-analog conversion circuit that applies an offset voltage to the inverting input terminal in response to a change in a voltage value of the power supply voltage supplied to the load,
    wherein the offset voltage is changed according to digital data supplied to the digital-to-analog conversion circuit.

11. The system according to claim 10, wherein the digital-to-analog conversion circuit is a current digital-to-analog conversion circuit that converts the digital data into an analog current, and the converted analog current is supplied to a resistive element that is connected between the inverting input terminal of the error amplifier and the differential amplifier.

12. The system according to claim 11, wherein, when the power supply voltage is increased, the current digital-to-analog conversion circuit supplies a current to the resistive element.

13. The system according to claim 11, wherein, when the power supply voltage is reduced, the current digital-to-analog conversion circuit draws a current from the resistive element.

14. A system comprising:
   a CPU that operates according to a program;
   a voltage regulator that generates a power supply voltage supplied to the CPU; and
   a controller that is connected to the CPU and the voltage regulator and controls the voltage regulator according to a command from the CPU;
   wherein the controller comprises:
      a microcontroller unit that analyzes and executes a command according to a program;
      a digital signal processing unit that, upon activation, performs signal processing on digital data corresponding to a value of the power supply voltage and transitions to a standby state after the signal processing;
      a control circuit that activates the digital signal processing unit at a predetermined time interval; and
      a voltage indication register that holds data for determining the value of the power supply voltage,
   wherein the microcontroller unit interprets a predetermined command to set data to the voltage indication register and performs control so that the power supply voltage according to the data held in the voltage indication register is supplied from the voltage regulator to the load.

15. The system according to claim 14, wherein the controller is formed on one semiconductor chip.

16. The system according to claim 14, wherein the controller further includes a telemetry register that holds data obtained from the signal processing by the digital signal processing unit.

17. The system according to claim 16, wherein the controller further includes an analog-to-digital conversion circuit that converts the value of the power supply voltage into digital data, and the analog-to-digital conversion circuit is activated by the control circuit at a predetermined time interval.

18. The system according to claim 17, wherein the microcontroller unit, in response to an analysis result of the predetermined command, outputs the data held in the telemetry register to an issuer of the command.

* * * * *